(12) United States Patent
Cha et al.

(10) Patent No.: US 11,882,018 B2
(45) Date of Patent: Jan. 23, 2024

(54) APPARATUS AND METHOD FOR ANALYZING NETWORK IN CLOUD ENVIRONMENT

(71) Applicant: SAMSUNG SDS CO., LTD., Seoul (KR)

(72) Inventors: Jung Do Cha, Seoul (KR); Jung Hyun Ahn, Seoul (KR); Hyeong Jin Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 193 days.

(21) Appl. No.: 17/514,029

(22) Filed: Oct. 29, 2021

(65) Prior Publication Data

US 2022/0141122 A1 May 5, 2022

(30) Foreign Application Priority Data

Nov. 5, 2020 (KR) ........................ 10-2020-0146718

(51) Int. Cl.
| | |
|---|---|
| H04L 12/66 | (2006.01) |
| H04L 45/12 | (2022.01) |
| H04L 67/10 | (2022.01) |
| H04L 41/02 | (2022.01) |
| H04L 45/02 | (2022.01) |

(52) U.S. Cl.
CPC ............. *H04L 45/12* (2013.01); *H04L 41/02* (2013.01); *H04L 45/02* (2013.01); *H04L 67/10* (2013.01)

(58) Field of Classification Search
CPC ....... H04L 41/12; H04L 41/122; H04L 45/02; H04L 41/40; H04L 41/0895; H04L 41/0816; H04L 41/145; H04L 49/70; H04L 12/4641; H04L 45/04; H04L 45/586; H04L 61/103; H04L 45/38; H04L 45/54; H04L 67/10; H04L 41/0894; H04L 12/1836; H04L 45/66; H04L 12/28; H04L 63/029; H04L 63/0236; H04L 41/0866
USPC ........ 709/220, 223, 224, 227, 238; 370/351, 370/390, 401, 466
See application file for complete search history.

(56) References Cited

U.S. PATENT DOCUMENTS

| | | | | |
|---|---|---|---|---|
| 8,621,552 | B1 * | 12/2013 | Lotem ................. | H04L 63/0263 713/193 |
| 11,119,739 | B1 * | 9/2021 | Allen .................. | H04L 63/0263 |
| 11,470,047 | B1 * | 10/2022 | Shevade ............ | H04L 12/4641 |
| 2006/0230129 | A1 * | 10/2006 | Swami ................ | H04W 12/126 709/223 |
| 2008/0301765 | A1 * | 12/2008 | Nicol ..................... | H04L 63/20 726/1 |
| 2018/0332109 | A1 * | 11/2018 | Branch ............... | H04L 67/1004 |

(Continued)

*Primary Examiner* — Kharye Pope
(74) *Attorney, Agent, or Firm* — NSIP Law

(57) ABSTRACT

An apparatus for analyzing a network according to an embodiment includes a receiving module configured to receive, from a cloud service, information on one or more resources included in the cloud service and information on a network environment of the one or more resources, a topology generation module configured to derive a network topology of the cloud service by using the information on the resources and the information on the network environment, and an analysis module configured to derive, from the network topology, a communication possible path of each of the one or more resources and one or more communication allow policies in the communication possible path.

24 Claims, 19 Drawing Sheets

(56) References Cited

U.S. PATENT DOCUMENTS

2020/0177638 A1\* 6/2020 Salman ................. H04L 63/205
2021/0073065 A1\* 3/2021 Bhatnagar ............... H04L 43/20

\* cited by examiner

FIG. 16

PARALLEL ANALYSIS(A', B')=X

| SEQ | Action | DESTINATION | PROTOCOL | PORT |
|---|---|---|---|---|
| ① | ALLOW | 180.95.77.0/24 | TCP | 80 |
| ② | ALLOW | 73.5.60.8/32 | TCP | 3389 |
| ③ | ALLOW | 10.25.66.0/25 | UDP | 20000-30000 |
| ④ | ALLOW | 112.106.0.0/16 | TCP | 22 |
| ⑤ | ALLOW | 49.77.90.25/32 | TCP | 443 |

INDIVIDUAL ANALYSIS(C)=Y

| SEQ | Action | DESTINATION | TCP | UDP |
|---|---|---|---|---|
| ① | ALLOW | 0.0.0.0 ~ 180.95.76.255<br>180.96.77.251 ~ 255.255.255.255 | - | ALL |
| ② | ALLOW | 0.0.0.0 ~ 49.77.90.24<br>49.77.90.26 ~ 180.95.76.255<br>180.96.77.251 ~ 255.255.255.255 | ALL | - |

SERIES ANALYSIS(X, Y)

| SERIES ANALYSIS | DESTINATION | TCP | UDP | RESULT |
|---|---|---|---|---|
| X(①)∧Y(①) | 180.95.77.251~255 | NO OVERLAPPING PORT | NO OVERLAPPING PORT | EXCLUSION |
| X(①)∧Y(②) | 180.95.77.251~255 | 80 | NO OVERLAPPING PORT | INCLUSION |
| X(②)∧Y(①) | 73.5.60.8/32 | NO OVERLAPPING PORT | NO OVERLAPPING PORT | EXCLUSION |
| X(②)∧Y(②) | 73.5.60.8/32 | 3389 | NO OVERLAPPING PORT | INCLUSION |
| X(③)∧Y(①) | 10.25.66.0/25 | NO OVERLAPPING PORT | 20000-30000 | INCLUSION |
| X(③)∧Y(②) | 10.25.66.0/25 | NO OVERLAPPING PORT | NO OVERLAPPING PORT | EXCLUSION |
| X(④)∧Y(①) | 112.106.0.0/16 | NO OVERLAPPING PORT | NO OVERLAPPING PORT | EXCLUSION |
| X(④)∧Y(②) | 112.106.0.0/16 | 22 | NO OVERLAPPING PORT | INCLUSION |
| X(⑤)∧Y(①) | 49.77.90.25/32 | NO OVERLAPPING PORT | NO OVERLAPPING PORT | EXCLUSION |
| X(⑤)∧Y(②) | 49.77.90.25/32 | NO OVERLAPPING PORT | NO OVERLAPPING PORT | EXCLUSION |

| RESULT | COMMUNICATION POSSIBLE DESTINATION | TCP | UDP |
|---|---|---|---|
| ① | 180.95.77.251~255 | 80 | |
| ② | 73.5.60.8/32 | 3389 | |
| ③ | 10.25.66.0/25 | | 20000-30000 |
| ④ | 112.106.0.0/16 | 22 | |

| VIRTUAL PRIVATE BAND INFORMATION | SUBNET INFORMATION | RESOURCE ID | SERVER(VM) IP ADDRESS | COMMUNICATION DIRECTION | COMMUNICATION ALLOW IP | COMMUNICATION ALLOW PORT (PROTOCOL) | STATEFUL FIREWALL ID | STATELESS FIREWALL ID | ROUTING TABLE ID |
|---|---|---|---|---|---|---|---|---|---|
| 65.7.0.0/16 | 65.7.130.0/24 | rsc-09a2b1 | 65.7.130.5 | Out | 180.95.77.251~255 | 80 (TCP) | stf-0b1525 | stl-52c2aa | rt-7ddfr1 |
| 65.7.0.0/16 | 65.7.130.0/24 | rsc-09a2b1 | 65.7.130.6 | Out | 112.106.54.2~255 | 22 (TCP) | stf-0c1535 | stl-52c2aa | rt-7ddfr1 |

APPARATUS AND METHOD FOR ANALYZING NETWORK IN CLOUD ENVIRONMENT

CROSS-REFERENCE TO RELATED APPLICATION(S) AND CLAIM OF PRIORITY

This application claims the benefit under 35 USC § 119(a) of Korean Patent Application No. 10-2020-0146718, filed on Nov. 5, 2020, in the Korean Intellectual Property Office, the entire disclosure of which is incorporated herein by reference for all purposes.

BACKGROUND

1. Field

The following description relates to a technology for network analysis in a cloud environment.

2. Description of Related Art

As cloud services become common, security issues in the cloud environment are also increasing. As cloud hacking incidents are on the rise, there are growing concerns about large-scale financial incidents and leakage of personal information or corporate data.

In the case of cloud services, due to the nature of cloud services, cloud service providers (CSPs) and users of cloud services often share responsibility for data protection and security. That is, the cloud service providers protect the infrastructure provided by the cloud service, and the cloud service users are responsible for the security settings provided in the cloud, such as permission settings and firewall settings. However, in order to check the security settings of the cloud, especially a communication possible path of cloud resources such as servers or databases, a person in charge of security has to directly access a console and manually analyze the security settings one by one, which requires a lot of time and manpower.

SUMMARY

The disclosed embodiments are intended to provide a technical means for efficiently analyzing each of communication possible paths constituting a cloud service and one or more communication allow policies in each communication possible path.

In one general aspect, there is provided an apparatus for analyzing a network, including a receiving module configured to receive, from a cloud service, information on one or more resources included in the cloud service and information on a network environment of the one or more resources, a topology generation module configured to derive a network topology of the cloud service by using the information on the resources and the information on the network environment, and an analysis module configured to derive, from the network topology, a communication possible path of each of the one or more resources and one or more communication allow policies in the communication possible path.

The information on the network environment may include one or more of a network interface, a stateful firewall policy, a stateless firewall policy, a routing table, and gateway information associated with the one or more resources.

The analysis module may include a first analysis sub-module configured to generate a communication possible path of each of the one or more resources and a second analysis sub-module configured to derive the one or more communication allow policies by performing one or more of a firewall policy analysis and a routing table analysis on the communication possible path.

The first analysis sub-module may be configured to, when an IP allocated to the resource is a public IP, identify a communication path including one or more of a stateful firewall allocated to the resource, a stateless firewall in a subnet to which the resource belongs, and a router in the subnet, and add the identified communication path to an external communication possible path of the resource when an Internet gateway is included in a routing destination of the router.

The first analysis sub-module may be configured to, when an IP allocated to the resource is a private IP, identify a communication path including one or more of a stateful firewall allocated to the resource, a first stateless firewall in a first subnet to which the resource belongs, and a first router, and add a second stateless firewall in a second subnet to which a NAT gateway belongs and a second router to the identified communication path when the NAT gateway is included in a routing destination of the first router.

The first analysis sub-module may be configured to add the identified communication path to an external communication possible path of the resource, when an Internet gateway is included in a routing destination of the second router.

The first analysis sub-module may be configured to identify a communication path including a stateful firewall allocated to the resource, a stateless firewall in a subnet to which the resource belongs, and a router in the subnet, and add the identified communication path to an internal communication possible path of the resource when a gateway for internal communication is included in a routing destination of the router.

The second analysis sub-module may be configured to derive an individual communication allow policy of each of one or more firewalls existing on the communication possible path, and derive a communication allow policy of the one or more firewalls from the individual communication allow policy.

The second analysis sub-module may be configured to derive a communication allow policy of the stateless firewall by comparing communication possible band information of the stateless firewall and a dynamic port allow policy of a resource connected to the stateless firewall, when the firewall is a stateless firewall.

The second analysis sub-module may be configured to derive a communication allow policy of the firewalls by applying a parallel analysis between the individual communication allow policies of firewalls located in the same layer and applying a serial analysis between the individual communication allow policies of firewalls located in different layers, in the communication possible path.

The second analysis module may be configured to derive a routing allow policy from a routing table of each of one or more routers located on the communication possible path, and derive an intersection of the communication allow policy of the firewalls and the routing allow policy as the communication allow policy of the resource.

The second analysis module may be configured to derive the routing allow policy by identifying a routing policy corresponding to a destination of the communication possible path among the routing policies of the routing tables.

In another general aspect, there is provided a network analysis method that is performed by a computing device including one or more processors and a memory storing one or more programs executed by the one or more processors, the method including: receiving, from a cloud service, information on one or more resources included in the cloud service and information on a network environment of the one or more resources; deriving a network topology of the cloud service by using the information on the resources and the information on the network environment; and deriving, from the network topology, a communication possible path of each of the one or more resources and one or more communication allow policies in the communication possible path.

The information on the network environment may include one or more of a network interface, a stateful firewall policy, a stateless firewall policy, a routing table, and gateway information associated with the one or more resources.

The deriving of the communication allow policy may include a first analysis step of generating a communication possible path of each of the one or more resources, and a second analysis step of deriving the one or more communication allow policies by performing one or more of a firewall policy analysis and a routing table analysis on the communication possible path.

The first analysis step may include when an IP allocated to the resource is a public IP, identifying a communication path including one or more of a stateful firewall allocated to the resource, a stateless firewall in a subnet to which the resource belongs, and a router in the subnet, and adding the identified communication path to an external communication possible path of the resource when an Internet gateway is included in a routing destination of the router.

The first analysis step may include when an IP allocated to the resource is a private IP, identifying a communication path including one or more of a stateful firewall allocated to the resource, a first stateless firewall in a first subnet to which the resource belongs, and a first router, and adding a second stateless firewall in a second subnet to which a NAT gateway belongs and a second router to the identified communication path when the NAT gateway is included in a routing destination of the first router.

The first analysis step may include adding the identified communication path to an external communication possible path of the resource, when an Internet gateway is included in a routing destination of the second router.

The first analysis sub-module may include identifying a communication path including a stateful firewall allocated to the resource, a stateless firewall in a subnet to which the resource belongs, and a router in the subnet, and adding the identified communication path to an internal communication possible path of the resource when a gateway for internal communication is included in a routing destination of the router.

The second analysis step may include deriving an individual communication allow policy of each of one or more firewalls existing on the communication possible path, and deriving a communication allow policy of the one or more firewalls from the individual communication allow policy.

The second analysis step may include deriving a communication allow policy of the stateless firewall by comparing communication possible band information of the stateless firewall and a dynamic port allow policy of a resource connected to the stateless firewall, when the firewall is the stateless firewall.

The second analysis step may include deriving a communication allow policy of the firewalls by applying a parallel analysis between the individual communication allow policies of firewalls located in the same layer and applying a serial analysis between the individual communication allow policies of firewalls located in different layers, in the communication possible path.

The second analysis step may include deriving a routing allow policy from a routing table of each of one or more routers located on the communication possible path, and deriving an intersection of the communication allow policy of the firewalls and the routing allow policy as the communication allow policy of the resource.

The second analysis step may include deriving the routing allow policy by identifying a routing policy corresponding to a destination of the communication possible path among the routing policies of the routing tables.

BRIEF DESCRIPTION OF THE DRAWINGS

FIGS. 13 to 18 are diagrams for illustrating an example of a process of analyzing a network in a cloud service according to an embodiment.

DETAILED DESCRIPTION

Figure 1:
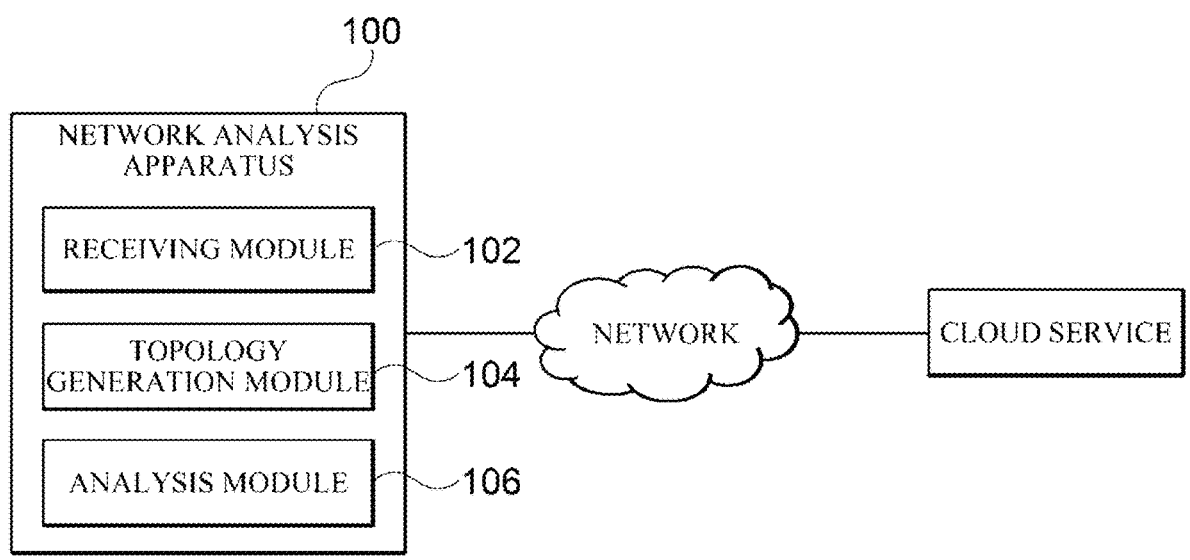
FIG. 1 is a block diagram for illustrating a network analysis apparatus according to an embodiment.

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present invention, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

In the present specification, a cloud resource may be defined as follows.

The network interface is responsible for a traffic function that generates communication packets in a cloud environment and forwards packets to or receives packets from other areas using communication equipment and lines as media.

In the cloud environment, a firewall may be attached to the network interfaces. In this case, the firewall may be classified as a stateful firewall or a stateless firewall. In addition, the firewall may be either an inbound firewall or an outbound firewall, or may simultaneously serve as an inbound firewall and an outbound firewall.

One or more rules may be registered in each firewall. In this case, the rule may include only an access allow rule, or include both an allow rule and a deny rule. If the firewall includes both the allow rule and the deny rule, the allowable traffic range may vary depending on the application order of each rule. The allow and deny rules of the firewall include protocol, IP, and port.

All services in the cloud that attach one or more of the above-mentioned network interfaces and are responsible for transmitting and receiving data as a subject of communication are referred to as resources. Cloud resources deliver processed or raw data into or out of the cloud via a network interface. Examples of such resources include servers or databases.

The network interface owns at least one private IP, and the IP belongs to the range of a specific subnet. That is, a network interface belongs to the specific subnet. The network interface belonging to a subnet follow a routing table rule connected to the subnet, and also follows a firewall rule when a separate firewall is connected to the subnet. Here, the characteristics of the firewall connected to the subnet are the same as described above.

When two or more network interfaces are attached to one resource, a packet generated by the resource follows a subnet rule to which the network interface belongs, and a packet path is determined accordingly.

Communication of cloud resources may be classified into two types based on the target: communication between cloud resources and communication with external areas.

Communication between cloud resources refers to communication within the same cloud environment. In this case, a communication counterpart may be a cloud resource generated/managed by a specific cloud top-level administrator account (A) or a sub-administrator account of the account, or a cloud resource generated/managed by another cloud administrator account (B) with the same top-level privileges as the top-level administrator account (A). In addition, communication between the cloud resource and other areas refers to communication with data centers, other business sites, other cloud resources, and other servers existing on the external Internet, which exist outside the cloud environment.

The communication flow of a packet (outbound packet) generated from the cloud resource is as follows. First, the cloud resource selects a network interface to communicate with according to the destination of a newly generated packet. When there is only one network interface connected to the cloud resource, the process may be omitted.

The network interface checks routing information of a subnet to which it belongs and delivers the packet to the gateway for communication to the destination.

When the gateway receiving the packet is an Internet gateway, the gateway determines whether the resource generating the packet has a public IP. When the resource has a public IP capable of Internet communication (that is, when a public IP is set in the network interface), the gateway delivers the packet to the Internet. Otherwise, when the resource does not have a public IP, the packet is discarded, which leads to communication failure.

When the gateway receiving the packet is a NAT gateway, the NAT gateway checks whether an Internet gateway exists in the routing of the subnet to which the NAT gateway belongs, and then delivers the received packet to the Internet gateway. The Internet gateway having received the packet transmits the packet to the Internet.

When the gateway receiving the packet is another gateway, the packet's movement path is determined by the routing of the gateway, that is, a gateway located next to the gateway. Other gateway types are as follows, for example.

Local gateway: gateway belonging to the same subnet or another subnet belonging to the same cloud network Virtual gateway (VGW): gateway for VPN, leased line communication Peering connection gateway (PCX): gateway for communicating with other virtual cloud networks Transit Gateway (TGW): gateway that acts as a switch to route VPNs, leased lines, peering, or the like as a central hub Conversely, the communication flow of a packet flowing into the cloud resource (inbound packets) is opposite to the above process, and is as follows.

First, the gateway checks the destination of the inbound packet and delivers the packet to a subnet router of a virtual cloud network corresponding to a destination. The router checks a destination network interface to transmit the packet from the destination (resource) of the packet, and forwards the packet to the destination network interface. Then, the packet is finally delivered to the resource using the network interface.

The firewall provided in the cloud environment has to satisfy all the following four conditions.

First, at least one stateful or stateless firewall has to exist in the cloud network space, and a configuration form thereof is as follows.

1) Serial (or parallel) configuration between stateful firewalls

2) Serial (or parallel) configuration between stateless firewalls

3) Serial or parallel configuration of a mixture of stateful and stateless firewalls Second, a firewall provider may be a cloud service provider (default firewall) or a third party.

Third, the location where the firewall(s) is located has to include at least one of the following areas, and as necessary, may be installed in all areas.

Network interface
Resource
Subnet
Virtual cloud network (set of subnets)

Fourth, the case of allowing or controlling in the form of an application within a resource such as a server is excluded (for example, Windows Firewall, access control tools, or the like configured in Windows).

FIG. 1 is a block diagram for illustrating a network analysis apparatus 100 according to an embodiment. The network analysis apparatus 100 according to an embodiment is a device for deriving a security risk of a cloud service by analyzing a firewall policy, a routing configuration, or the like, of the cloud service. As shown, the network analysis apparatus 100 according to an embodiment includes a receiving module 102, a topology generation module 104, and an analysis module 106.

The receiving module 102 receives, from a cloud service, information on one or more resources included in the cloud service and information on a network environment of the one or more resources. In an embodiment, the receiving module 102 may access the cloud service via a network, perform authentication by inputting authentication information of a connected cloud service, and then receive information on the resource and information on a network environment from the cloud service for which authentication is completed. In this case, the information on the network environment may include one or more of a network interface, a stateful firewall policy, a stateless firewall policy, a routing table, and gateway information associated with one or more resources.

The topology generation module 104 derives a network topology of the cloud service by using the information on the resource and the information on the network environment received via the receiving module 102. In the disclosed embodiments, the network topology refers to a physical or logical connection state of each component in the cloud service included in network configuration information.

In general, the architecture of the cloud service may be composed of the following layers.

1) Top level administrator account(s)
   In general, it is referred to as a subscription account, which means a unit account for which a fee is paid.
2) Information and identification information on IP band(s) of a virtual cloud area generated under the administrator account
   As one virtual cloud network area including multiple subnets, a service unit is usually generated in the area, where multiple subnets are generated and managed in one VPC.
   For example, a shopping mall service that serves the public may be managed by placing the web server that responds to images in the user's web browser in the public subnet, and placing the important server that processes payment information and user's personal information in the private subnet.
3) Subnet(s) with subdivided IP bands
   Subnet identification information (ID), IP band information, public/private information
   Routing table identification information (ID) with which the subnet is associated
   Firewall information connected to the subnet (the firewall application layer is different for each cloud and may not be used in subnets)
4) Resource(s) contained in each subnet
   IP (public, private) information of the resource, resource identifier (ID)
5) Network interface(s) of the resource
6) Firewall(s) associated with the network interface (the firewall application layer is different for each cloud and may not be used in the network interface)

Figure 2:
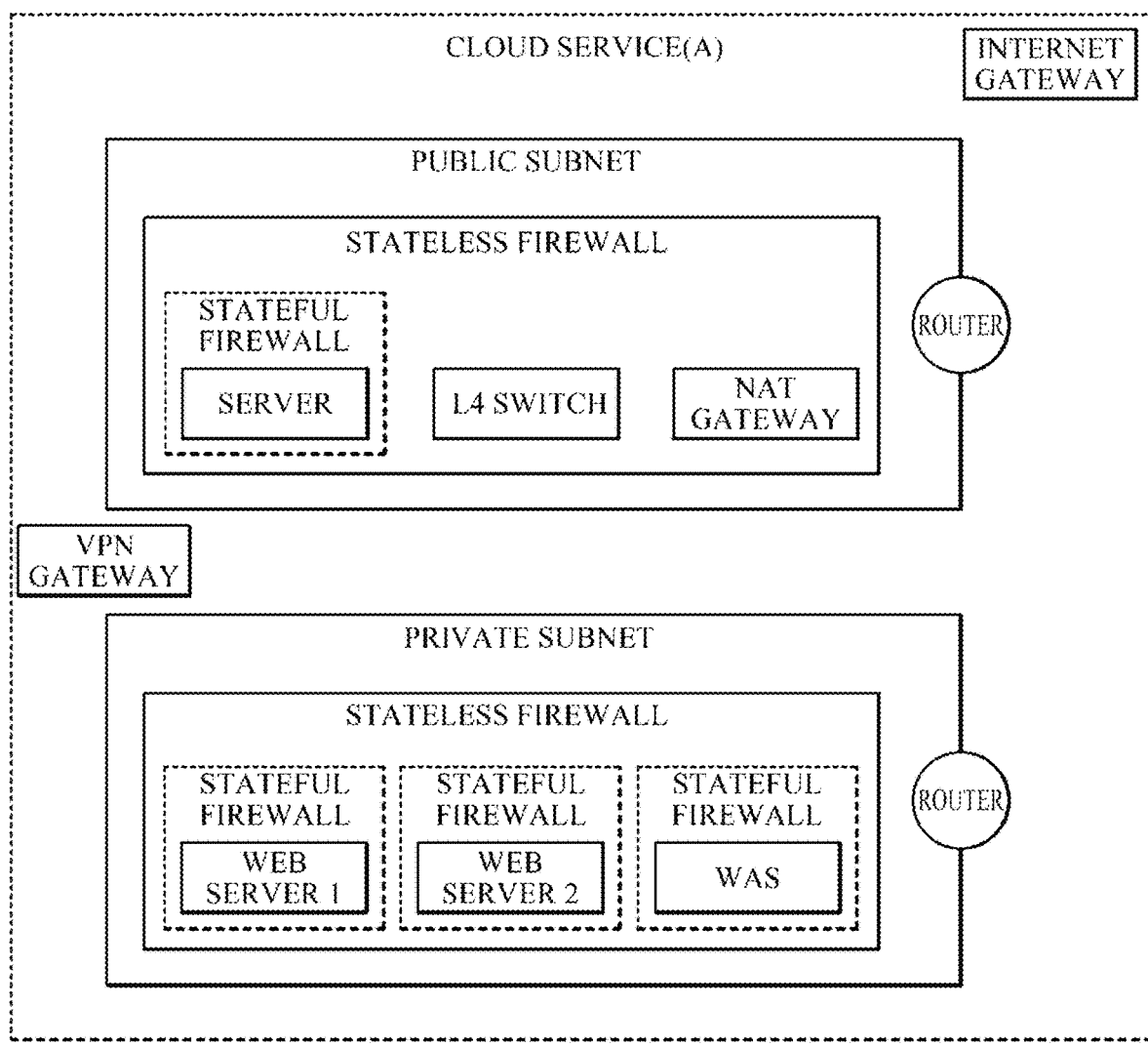
FIG. 2 is a diagram for illustrating an example of a network topology of a cloud service according to an embodiment.

FIG. 2 is a diagram for illustrating an example of a network topology of a cloud service according to an embodiment. An illustrated cloud service A includes two subnets: a public subnet and a private subnet. In addition, each subnet is provided with one or more stateful firewalls, stateless firewalls, and a router for transmitting and receiving packets. The router in the public subnet is connected to the Internet gateway to transmit and receive packets to and from an external Internet network, and the router in the private subnet is connected to an NAT gateway in the public subnet.

Referring back to FIG. 1, the analysis module 106 derives, from the network topology, a communication possible path of each of the one or more resources and one or more communication allow policies in the communication possible path.

Figure 3:
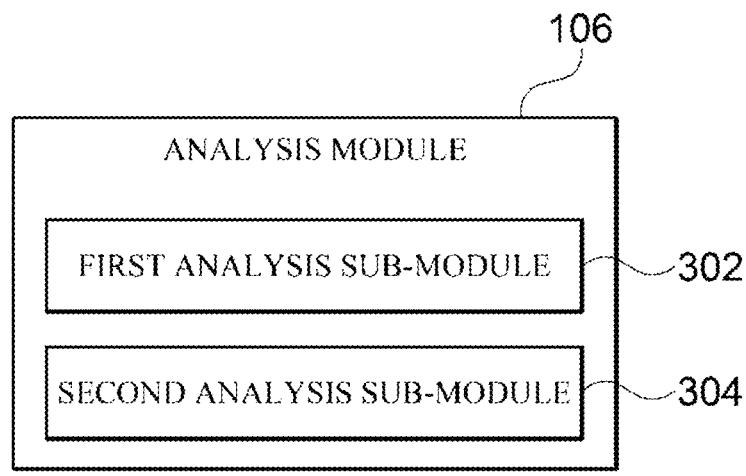
FIG. 3 is a block diagram for illustrating a detailed configuration of an analysis module according to an embodiment.

FIG. 3 is a block diagram for illustrating a detailed configuration of the analysis module 106 according to an embodiment. As illustrated, the analysis module 106 according to an embodiment includes a first analysis sub-module 302 and a second analysis sub-module 304.

The first analysis sub-module 302 generates one or more communication possible paths for each resource of the cloud network. In this case, the communication possible path includes an external communication possible path, which is a path that enables packet transmission and reception between each resource of the cloud service and the external Internet network, and an internal communication possible path, which is a path through which packets may be transmitted and received between resources inside the cloud server.

The first analysis sub-module 302 may generate one or more external communication possible paths for each resource of the cloud network. Specifically, when an IP allocated to the resource is a public IP, the first analysis sub-module 302 may identify a communication path including one or more of a stateful firewall allocated to the resource, a stateless firewall in a subnet to which the resource belongs, and a router in the subnet, and add the identified communication path to an external communication possible path of the resource when an Internet gateway is included in a routing destination of the router.

When an IP allocated to the resource is a private IP, the first analysis sub-module 302 may identify a communication path including one or more of a stateful firewall allocated to the resource, a first stateless firewall in a first subnet to which the resource belongs, and a first router, and add a second stateless firewall in a second subnet to which a NAT gateway belongs and a second router to the identified communication path when the NAT gateway is included in a routing destination of the first router. Furthermore, the first analysis sub-module 302 may add the identified communication path to an external communication possible path of the resource, when an Internet gateway is included in a routing destination of the second router.

Furthermore, the first analysis sub-module 302 may generate one or more internal communication possible paths for each resource of the cloud network. Specifically, the first analysis sub-module 302 may identify a communication path including a stateful firewall allocated to the resource, a stateless firewall in a subnet to which the resource belongs, and a router in the subnet, and add the identified communication path to an internal communication possible path of the resource when a gateway for internal communication is included in a routing destination of the router.

Figure 4:
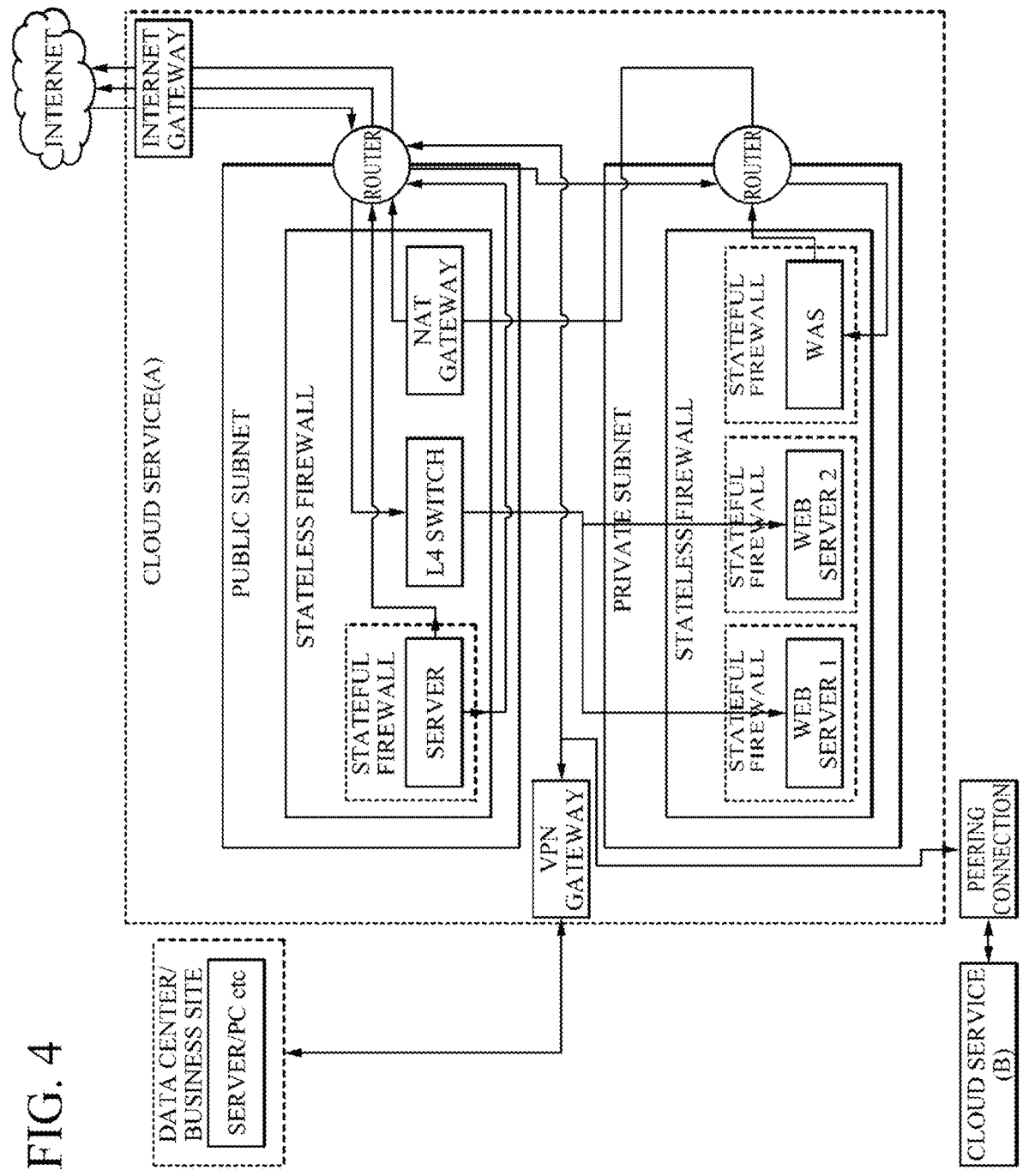
FIG. 4 is a diagram for illustrating an example of a communication possible path of each resource in a network topology of a cloud service according to an embodiment.

FIG. 4 is a diagram for illustrating an example of a communication possible path of each resource in a network topology of a cloud service according to an embodiment. Portions indicated by bold arrows in the drawing indicate communication possible paths. For example, the server in the public subnet is connected to the Internet network through the stateful firewall-the stateless firewall-the router-the Internet gateway. In addition, the WAS in the private subnet is connected to the Internet network through the stateful firewall-stateless firewall-the router in the private subnet-the stateless firewall in the public subnet-the NAT gateway in the public subnet-the stateless firewall in the public subnet-the router in the public subnet-the Internet gateway.

In addition, in the drawing, the VPN gateway is a gateway for connecting with a server or PC in another data center or business site via VPN or leased line communication, and a peering connection gateway (PCX) is a gateway for communicating with another virtual cloud network B.

Next, the second analysis sub-module 304 derives one or more communication allow policies by performing one or more of a firewall policy analysis and a routing table analysis on the communication possible path generated through the first analysis sub-module 302. In the disclosed embodiments, the communication allow policy includes a range of traffic that is actually communicable on a communication possible path, that is, an actual communicable protocol and an IP/Port range.

In an embodiment, the second analysis sub-module 304 may derive an individual communication allow policy of each of one or more firewalls existing on the communication possible path, and derive a communication allow policy of the one or more firewalls from the individual communication allow policy. In this case, when the firewall is the stateless firewall, the second analysis sub-module 304 may derive a communication allow policy of the stateless firewall by comparing communication possible band information of the stateless firewall and a dynamic port allow policy of a resource connected to the stateless firewall. The reason for this is as follows.

When the stateless firewall is analyzed, unlike the stateful firewall, the analysis of the protocol of the returned packet and the dynamic port used by the server is additionally required. For the stateful firewall, when the destination IP and port allow policy of the packet transmitted to the outside is registered as an outbound policy, an inbound policy for the returned packet is automatically applied. However, in the case of the stateless firewall, the inbound policy of the returned packet is not automatically applied. Therefore, in this case, the source IP and dynamic port allow policy for the returned packet are needed to be registered as the inbound policy.

In an embodiment, the second analysis sub-module 304 may derive a communication allow policy of the firewalls by applying a parallel analysis between individual communication allow policies of firewalls located in the same layer and applying a serial analysis between individual communication allow policies of firewalls located in different layers, in the communication possible path.

In addition, the second analysis sub-module 304 may derive a routing allow policy from a routing table of each of one or more routers located on the communication possible path, and derive an intersection of the communication allow policy of the firewalls and the routing allow policy as the communication allow policy of the resource. In this case, the second analysis sub-module 304 may derive the routing allow policy by identifying a routing policy corresponding to a destination of the communication possible path among the routing policies of the routing tables.

Figure 5:
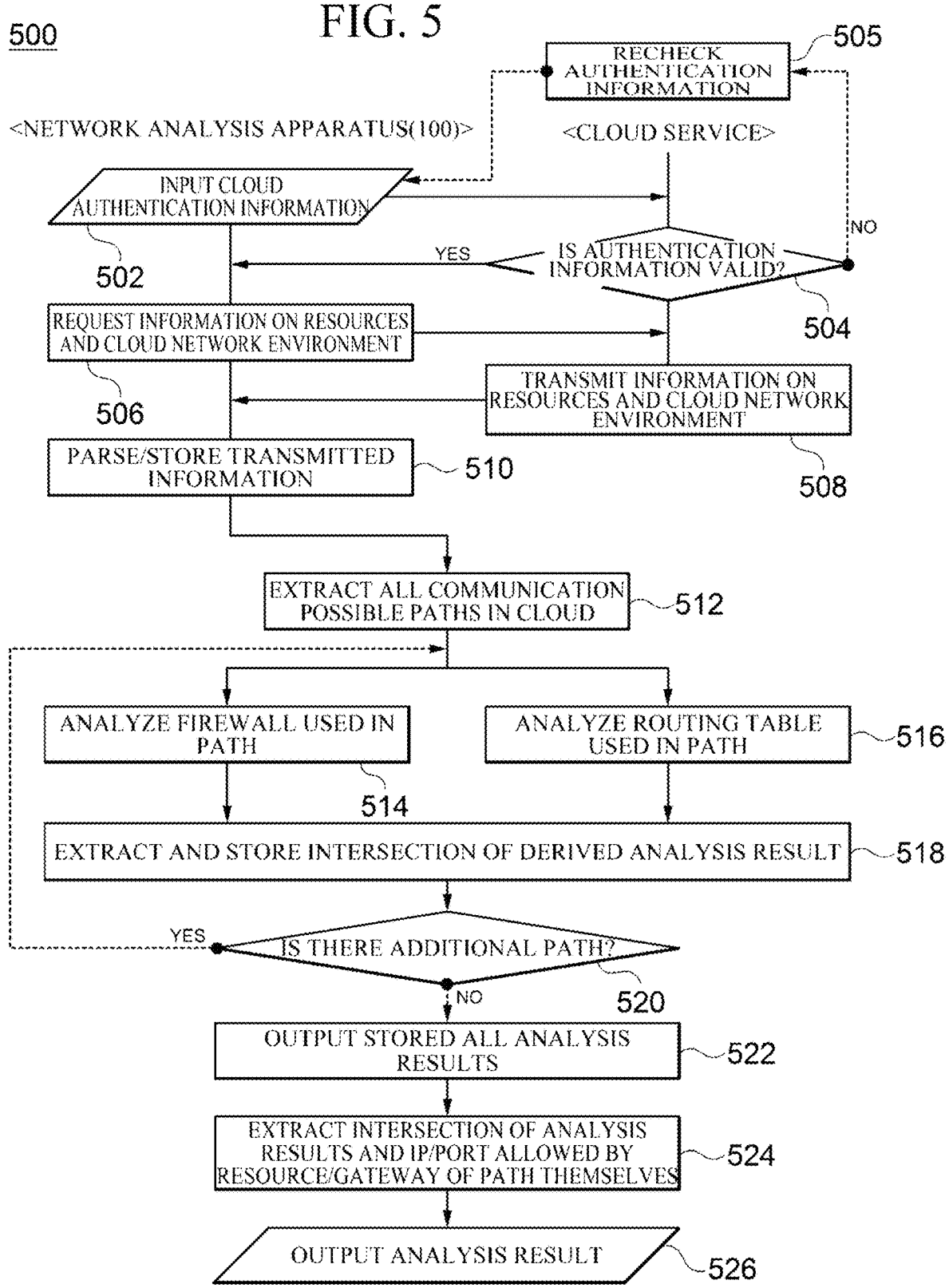
FIG. 5 is a flowchart for illustrating a network analysis method according to an embodiment.

FIG. 5 is a flowchart for illustrating a network analysis method 500 according to an embodiment. The illustrated method may be performed by a computing device including, for example, one or more processors, and a memory storing one or more programs executed by the one or more processors, for example the network analysis apparatus 100 described above. In the illustrated flowchart, the method or process is divided into a plurality of steps; however, at least some of the steps may be performed in a different order, performed together in combination with other steps, omitted, performed in subdivided steps, or performed by adding one or more steps not illustrated.

In step 502, the receiving module 102 of the network analysis apparatus 100 inputs authentication information to the cloud service.

In step 504, the cloud service determines the received authentication information is valid, and transmits an authentication response when the determination is affirmative. When the authentication information is not valid, the user of the network analysis apparatus 100 rechecks the authentication information (step 505) and re-inputs the cloud authentication information.

In step 506, the receiving module 102 requests the cloud service to transmit information on each of resources and the network environment constituting the cloud service.

In step 508, the cloud service that has received the request returns the requested information on the resources and the network environment.

In step 510, the topology generation module 104 of the network analysis apparatus 100 derives a network topology of the cloud service by parsing and storing the information on the network constitution received via the receiving module 102.

In step 512, the analysis module 106 of the network analysis apparatus 100 extracts a communication possible path of each of one or more resources from the network topology.

In steps 514 to 518, the analysis module 106 performs analysis on the firewalls and the routing table included in each communication possible path, and derives one or more communication allow policies from the derived analysis result.

In step 520, the analysis module 106 determines whether an additional path that has not been analyzed exists. When an additional path exists, steps 514 and subsequent steps are repeated.

When, as a result of the determination, no additional path that has not been analyzed exists, in steps 522 and 524, the analysis module 106 derives a final analysis result by extracting an intersection of the stored analysis results (communication allow policies) and the IP/PORT allowed by the resource and the gateway themselves. In this case, the IP/PORT allowed by the resource and the gateway themselves refer to the IP/PORT range that the resource and gateway ultimately want to take, independent of the communication allow policy. For example, in the case of a database, a case in which only the instance port is opened may be exemplified.

In step 526, the analysis module 106 outputs the final analysis result to an administrator or a user.

Figure 6:
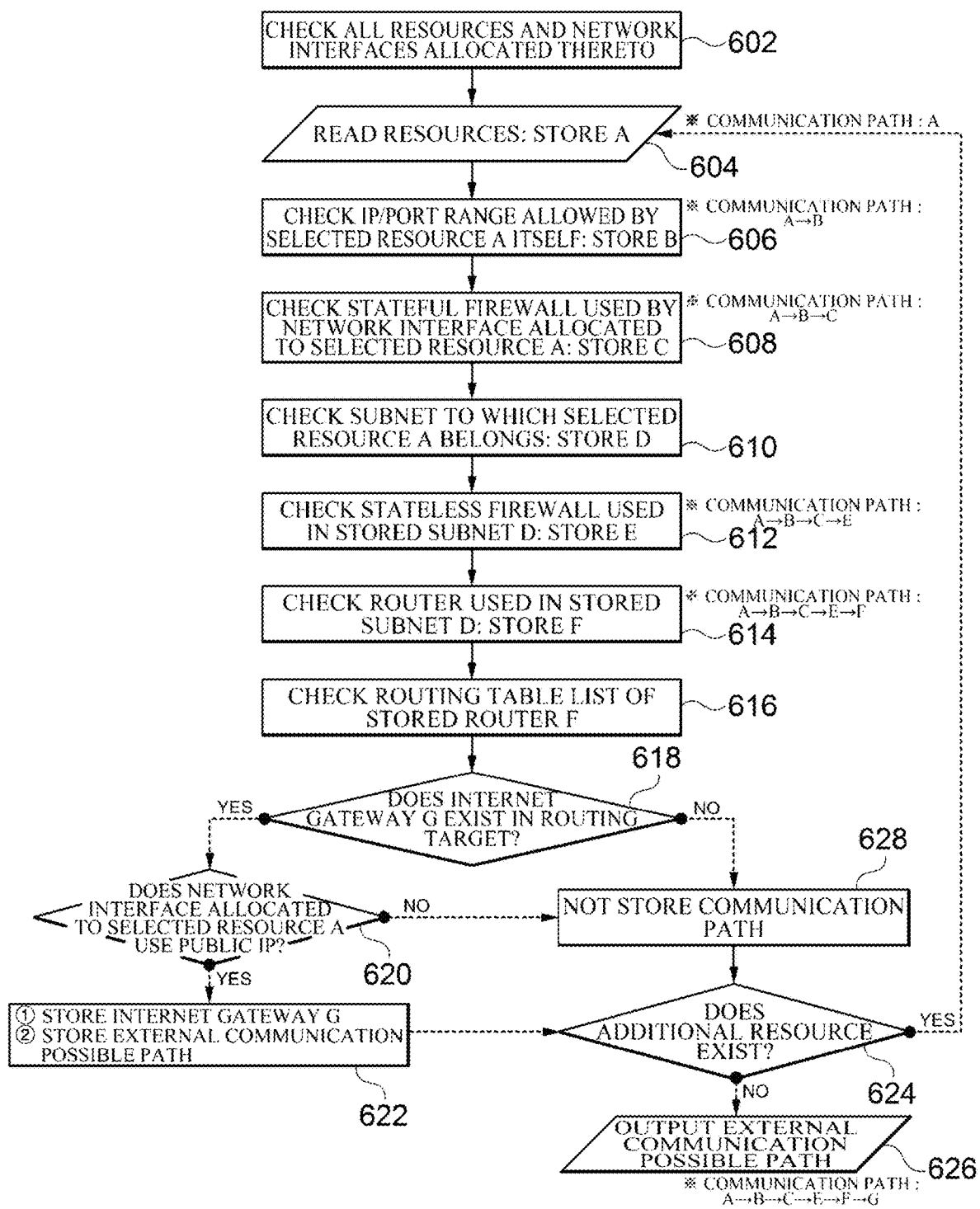
FIG. 6 is a flowchart for illustrating in more detail a process of extracting an external communication possible path of a public subnet in step 512 of the network analysis method according to an embodiment.

FIG. 6 is a flowchart for illustrating in more detail a process of extracting an external communication possible path of a public subnet in step 512 of the network analysis method 500 according to an embodiment.

In step 602, the analysis module 106 checks all the identified resources and the network interface allocated to each resource.

In step 604, the analysis module 106 selects one of the identified resources (communication path: A).

In step 606, the analysis module 106 checks the IP/Port range allowed by the selected resource itself and adds the allowed path to the communication path (communication path: A→B).

In step 608, the analysis module 106 checks the stateful firewall used by the network interface allocated to the selected resource A and adds it to the communication path (communication path: A→B→C).

In step 610, the analysis module 106 checks a subnet D to which the selected resource A belongs.

In step 612, the analysis module 106 checks a stateless firewall used in the stored subnet D and adds it to the communication path (communication path: A→B→C→E).

In step 614, the analysis module 106 checks a router used in the stored subnet D and adds it to the communication path (communication path: A→B→C→E→F).

In step 616, the analysis module 106 checks a routing table list of the stored router F.

In step 618, the analysis module 106 checks whether an Internet gateway G exists in the routing destination (target) of the routing table.

When the check result in step 618 is affirmative, in step 620, the analysis module 106 checks whether the network interface allocated to the selected resource A uses a public IP.

When, as the check result in step 620, the resource uses a public IP, in step 622, the analysis module 106 adds the Internet gateway G to the communication path (communication path: A→B→C→E→F→G), the corresponding path is stored as an external communication possible path.

On the other hand, when there is no Internet gateway in the routing destination or the resource does not use a public IP as the check result in step 618, in step 628, the analysis module 106 deletes the communication path identified so far.

In step 624, the analysis module 106 determines whether an additional resource exists, and when the determination is affirmative, returns the process to step 604.

On the other hand, when no additional resource exists, that is, when all paths for all resources are identified, in step 626, the analysis module 106 outputs the identified external communication possible path.

Figure 7:
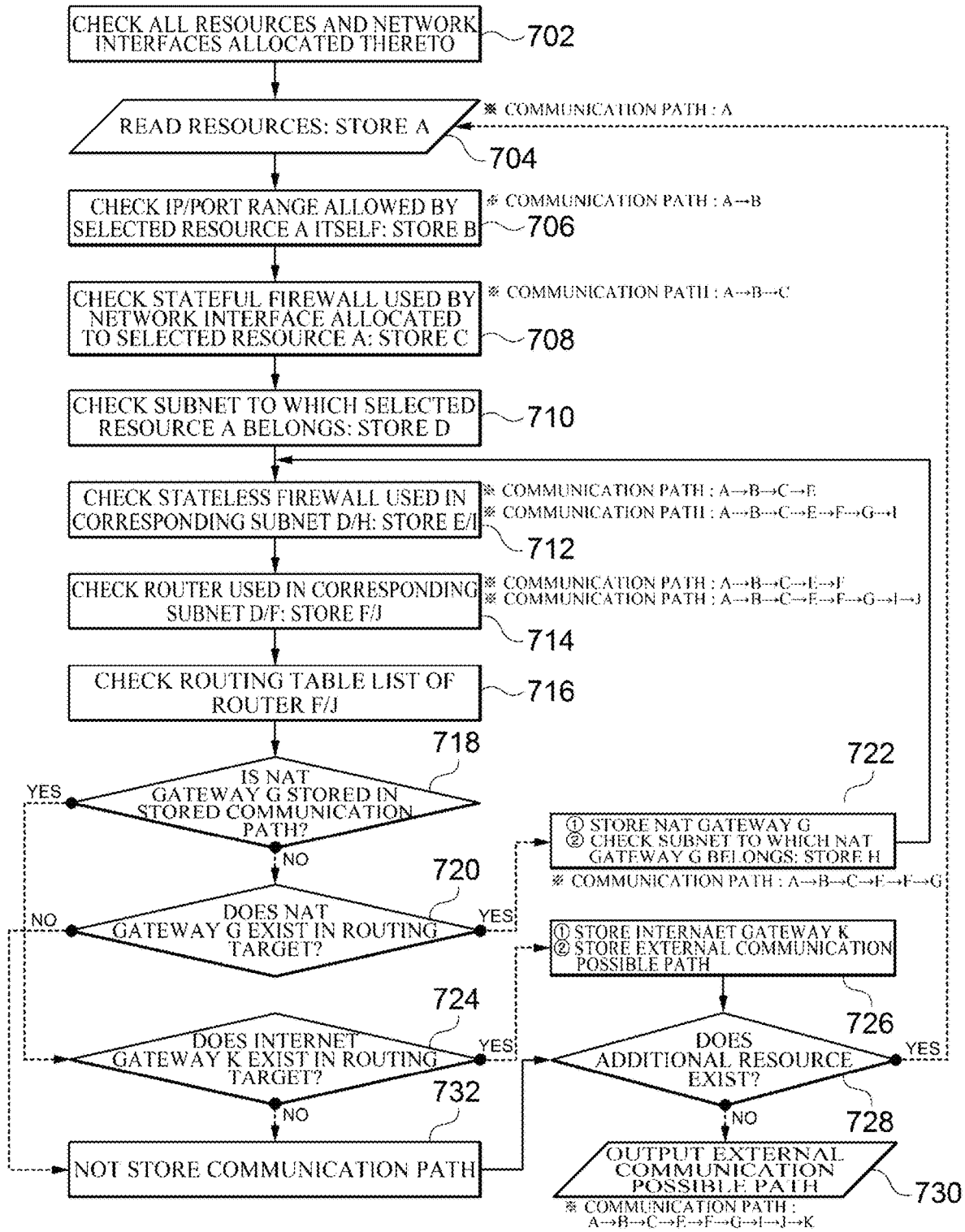
FIG. 7 is a flowchart for illustrating in more detail a process of extracting an external communication possible path of a private subnet in step 512 of the network analysis method according to an embodiment.

FIG. 7 is a flowchart for illustrating in more detail a process of extracting an external communication possible path of a private subnet in step 512 of the network analysis method 500 according to an embodiment.

In step 702, the analysis module 106 checks all the identified resources and the network interface allocated to each resource.

In step 704, the analysis module 106 selects one of the identified resources (communication path: A).

In step 706, the analysis module 106 checks the IP/Port range allowed by the selected resource A itself and adds the allowed path to the communication path (communication path: A→B).

In step 708, the analysis module 106 checks the stateful firewall used by the network interface allocated to the selected resource A and adds it to the communication path (communication path: A→B→C).

In step 710, the analysis module 106 checks a subnet D to which the selected resource A belongs.

In step 712, the analysis module 106 checks a stateless firewall E or I used in the stored subnet D or H below and adds it to the communication path (communication path: A→B→C→E).

In step 714, the analysis module 106 checks a router F or J used in the stored subnet D and adds it to the communication path (communication path: A→B→C→E→F).

In step 716, the analysis module 106 checks a routing table list of the stored router F or J.

In step 718, the analysis module 106 checks whether a NAT gateway G is stored in the communication path stored so far.

When the NAT gateway G is not stored in the communication path as the check result in step 718, in step 720, the analysis module 106 checks whether the NAT gateway G exists in the routing destination (target) of the routing table.

When the NAT gateway G exists in the routing destination (target) of the routing table as the check result in step 720, in step 722, the analysis module 106 adds the NAT gateway G to the communication path (communication path: A→B→C→E→F→G), checks the subnet H to which the NAT gateway G belongs, and then repeats step 712 and subsequent steps in the checked subnet (communication path: A→B→C→E→F→G→I→J).

When the NAT gateway G is stored in the stored communication path as the check result in step 718, in step 724, the analysis module 106 checks whether an Internet gateway K exists in the routing destination (target) of the routing table.

When the Internet gateway K exists in the routing destination (target) as the check result in step 724, in step 726, the analysis module 106 adds the Internet gateway K to the communication path (communication path: A→B→C→E→F→G→I→J→K), the corresponding path is stored as an external communication possible path.

On the other hand, when no Internet gateway exists in the routing destination as the check result in step 724, in step 732, the analysis module 106 deletes the communication path identified so far.

In step 728, the analysis module 106 determines whether an additional resource exists, and when the determination is affirmative, returns the process to step 704.

On the other hand, when no additional resource exists, that is, when all paths for all resources are identified, in step 730, the analysis module 106 outputs the identified external communication possible path.

Figure 8:
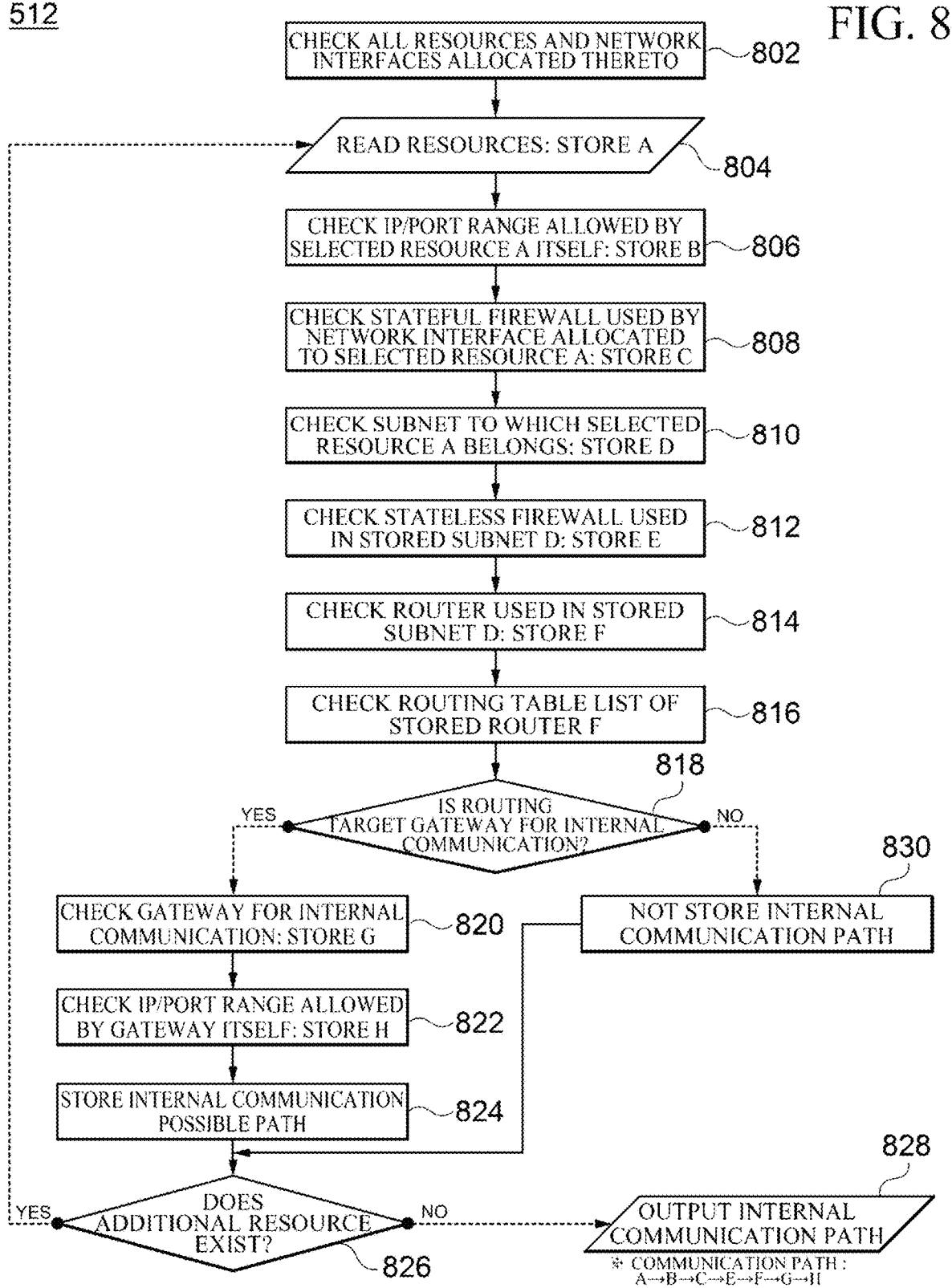
FIG. 8 is a flowchart for illustrating in more detail a process of extracting internal communication possible paths of all (public and private) subnets in step 512 of the network analysis method according to an embodiment.

FIG. 8 is a flowchart for illustrating in more detail a process of extracting internal communication possible paths of all (public and private) subnets in step 512 of the network analysis method 500 according to an embodiment.

In step 802, the analysis module 106 checks all the identified resources and the network interface allocated to each resource.

In step 804, the analysis module 106 selects one of the identified resources (communication path: A).

In step 806, the analysis module 106 checks the IP/Port range allowed by the selected resource itself and adds the allowed path to the communication path (communication path: A→B).

In step 808, the analysis module 106 checks the stateful firewall used by the network interface allocated to the selected resource A and adds it to the communication path (communication path: A→B→C).

In step 810, the analysis module 106 checks a subnet D to which the selected resource A belongs.

In step 812, the analysis module 106 checks a stateless firewall E used in the stored subnet D and adds it to the communication path (communication path: A→B→C→E).

In step 814, the analysis module 106 checks a router E used in the stored subnet D and adds it to the communication path (communication path: A→B→C→E→F).

In step 816, the analysis module 106 checks a routing table list of the stored router F.

In step 818, the analysis module 106 checks whether a gateway G for internal communication exists in the routing destination (target) of the routing table.

When the gateway G for internal communication exists as the check result in step 818, in steps 820 and 822, the analysis module 106 checks the gateway for internal communication, identifies the IP/Port range allowed by the gateway itself, and adds the allowed range to the communication path.

In step 824, the analysis module 106 stores the communication path identified so far as an internal communication path (communication path: A→B→C→E→F→G→H).

On the other hand, when there is no gateway for internal communication in the routing destination as the check result in step 818, in step 830, the analysis module 106 deletes the communication possible path identified so far.

In step 826, the analysis module 106 determines whether an additional resource exists, and when the determination is affirmative, returns the process to step 804.

On the other hand, when no additional resource exists, that is, when all paths for all resources are identified, in step 828, the analysis module 106 outputs the identified internal communication possible path.

Figure 9:
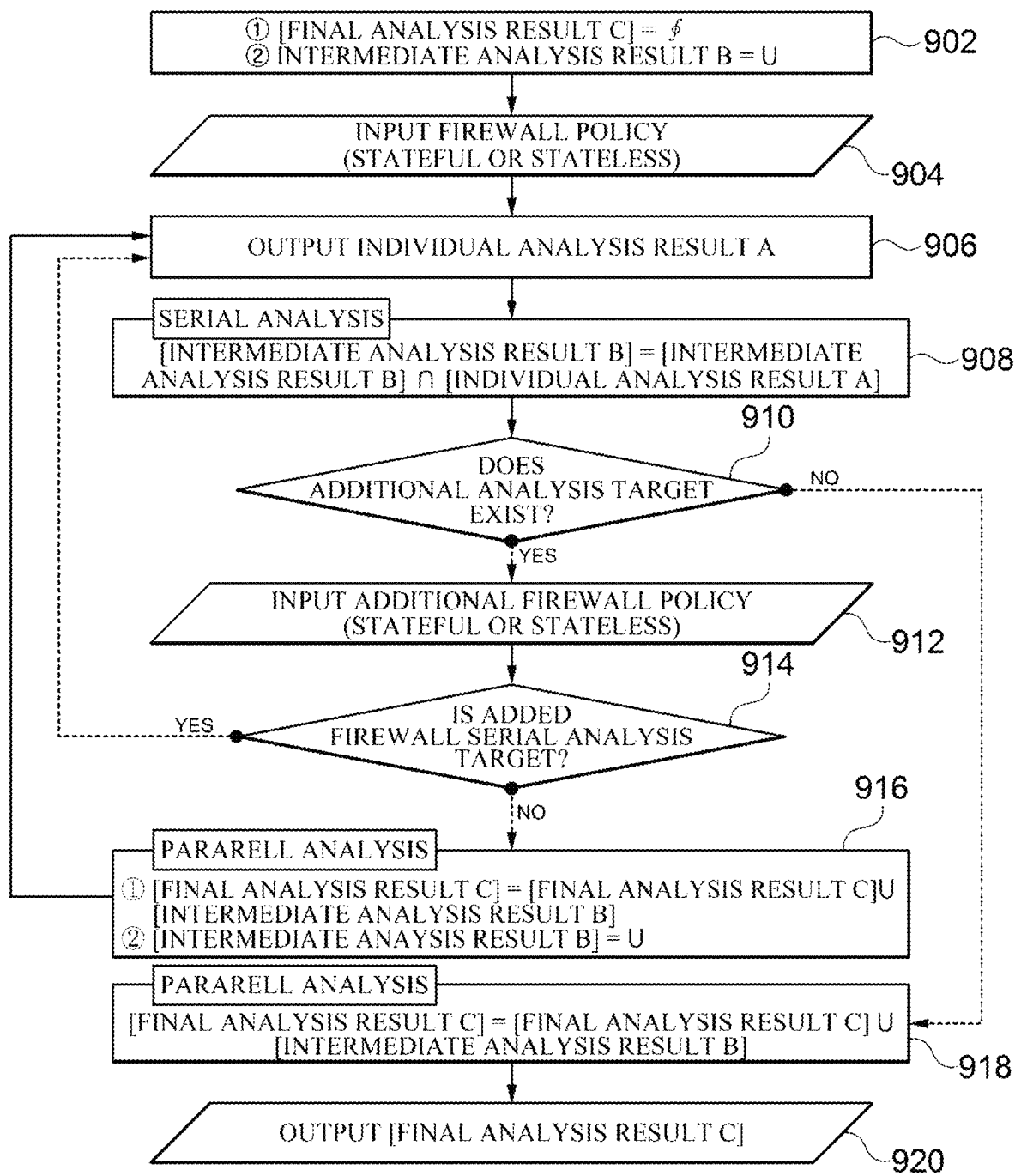
FIG. 9 is a flowchart for illustrating in more detail a process of analyzing a firewall in step 514 of the network analysis method according to an embodiment.

FIG. 9 is a flowchart for illustrating in more detail a process of analyzing a firewall in step 514 of the network analysis method 500 according to an embodiment.

As described above, the second analysis sub-module 304 performs the firewall policy analysis on the communication path generated through the first analysis sub-module 302. In the disclosed embodiments, the communication allow policy includes a range of traffic that is actually communicable on a communication allow path, that is, an actually communicable protocol and an IP/Port range. In an embodiment, the second analysis sub-module 304 may derive an individual communication allow policy of each of one or more firewalls existing on the communication possible path, and derive a communication allow policy of the one or more firewalls from the individual communication allow policy. In this case, the second analysis sub-module 304 derives the communication allow policy of the firewalls by applying a parallel analysis between individual communication allow policies of firewalls located in the same layer and applying a serial analysis between individual communication allow policies of firewalls located in different layers, in the communication possible path.

In step 902, the second analysis sub-module 304 sets a final analysis result C to $\emptyset$ (null set) and sets the intermediate analysis result B to U (universal set), respectively.

In step 904, the second analysis sub-module 304 receives a policy of an individual stateful or stateless firewall.

In step 906, the second analysis sub-module 304 derives the individual communication allow policy of the corresponding firewall through analysis of the input policy as an individual analysis result A.

In step 908, the second analysis sub-module 304 stores the intersection of the analysis result A and an intermediate analysis result B in the intermediate analysis result (serial analysis).

In step 910, the second analysis sub-module 304 determines whether an additional analysis target (stateless or stateful firewall) exists.

When an additional analysis target exists as the determination result in step 910, in step 912, the second analysis sub-module 304 additionally receives a policy of an individual stateful or stateless firewall.

In step 914, the second analysis sub-module 304 determines whether the added firewall is a serial analysis target, and when the added firewall is a serial analysis target, re-performs step 906 and subsequent steps.

When the added firewall is not a serial analysis target, in step 916 as the determination result in step 914, in step 916, the second analysis sub-module 304 stores the union of the final analysis result C and the intermediate analysis result B as the final analysis result C, and resets the intermediate analysis result to U.

On the other hand, when no additional analysis target exists as the determination result in step 910, in step 918, the second analysis sub-module 304 stores the union of the final analysis result C and the intermediate analysis result B as the final analysis result C.

In step 920, the second analysis sub-module 304 outputs the final analysis result C.

Figure 10:
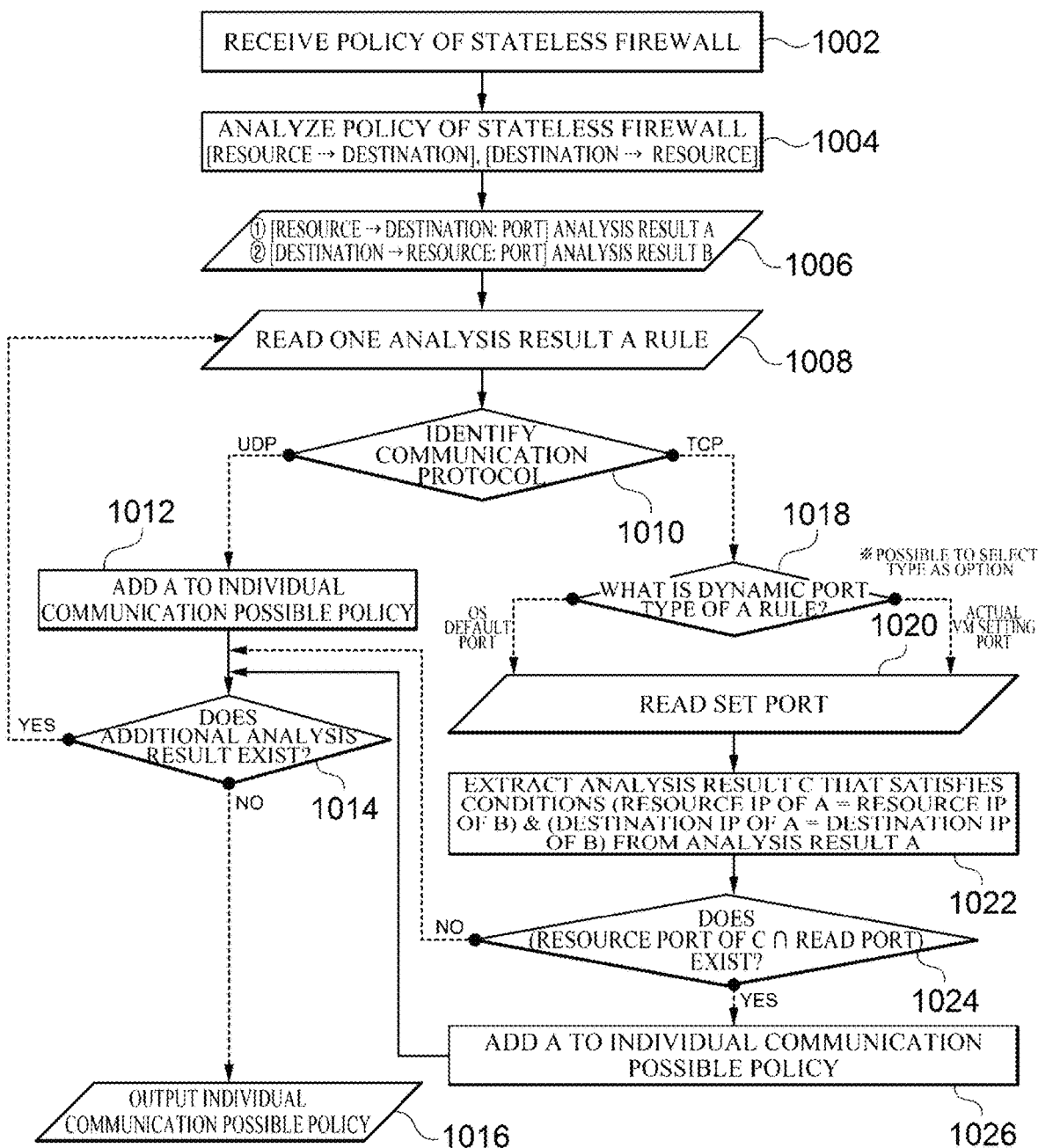
FIG. 10 is a flowchart for illustrating in more detail a process of analyzing an outbound policy of a stateless firewall in step 906 of a firewall analysis process according to an embodiment.

FIG. 10 is a flowchart for illustrating in more detail a process of analyzing an outbound policy of a stateless firewall in step 906 of a firewall analysis process 514 according to an embodiment.

In step 1002, the second analysis sub-module 304 receives a policy of the stateless firewall.

In step 1004, the second analysis sub-module 304 analyzes a [resource→destination] policy and a [resource←destination] policy of the stateless firewall, respectively.

In step 1006, the second analysis sub-module 304 outputs a [resource→destination: port] analysis result A and a [destination→resource: port] analysis result B, respectively.

In step 1008, the second analysis sub-module 304 reads A among the analysis results.

In step 1010, the second analysis sub-module 304 identifies the communication protocol of the analysis result A.

When the communication protocol of A is UDP, in step 1012, the second analysis sub-module 304 stores A in an individual communication possible policy of the corresponding stateless firewall.

In step 1014, the second analysis sub-module 304 determines whether there are more analysis results, and when there is, repeats step 1008 and subsequent steps.

When the analysis result does not exist anymore as the determination result in step 1014, in step 1016, the second analysis sub-module 304 outputs the individual communication possible policy.

On the other hand, when the communication protocol of A is TCP as the determination result in step 1010, in steps 1018 and 1020, the second analysis sub-module 304 reads a port set according to the dynamic port type of A (whether it is an OS default port or a port set in a real virtual machine (VM)).

In step 1022, the second analysis sub-module 304 derives an analysis result C that satisfies the following conditions from the analysis result A.

(Resource IP of A=resource IP of B)&&(destination IP of A=destination IP of B)

In step 1024, the second analysis sub-module 304 determines whether an intersection of the analysis result C and the port read in step 1020 exists.

When the intersection exists as the determination result in step 1024, the second analysis sub-module 304 adds the analysis result A to the communication possible policy and proceeds to step 1014. When no intersection exists as the determination result in step 1024, the second analysis sub-module 304 proceeds directly to step 1014.

Figure 11:
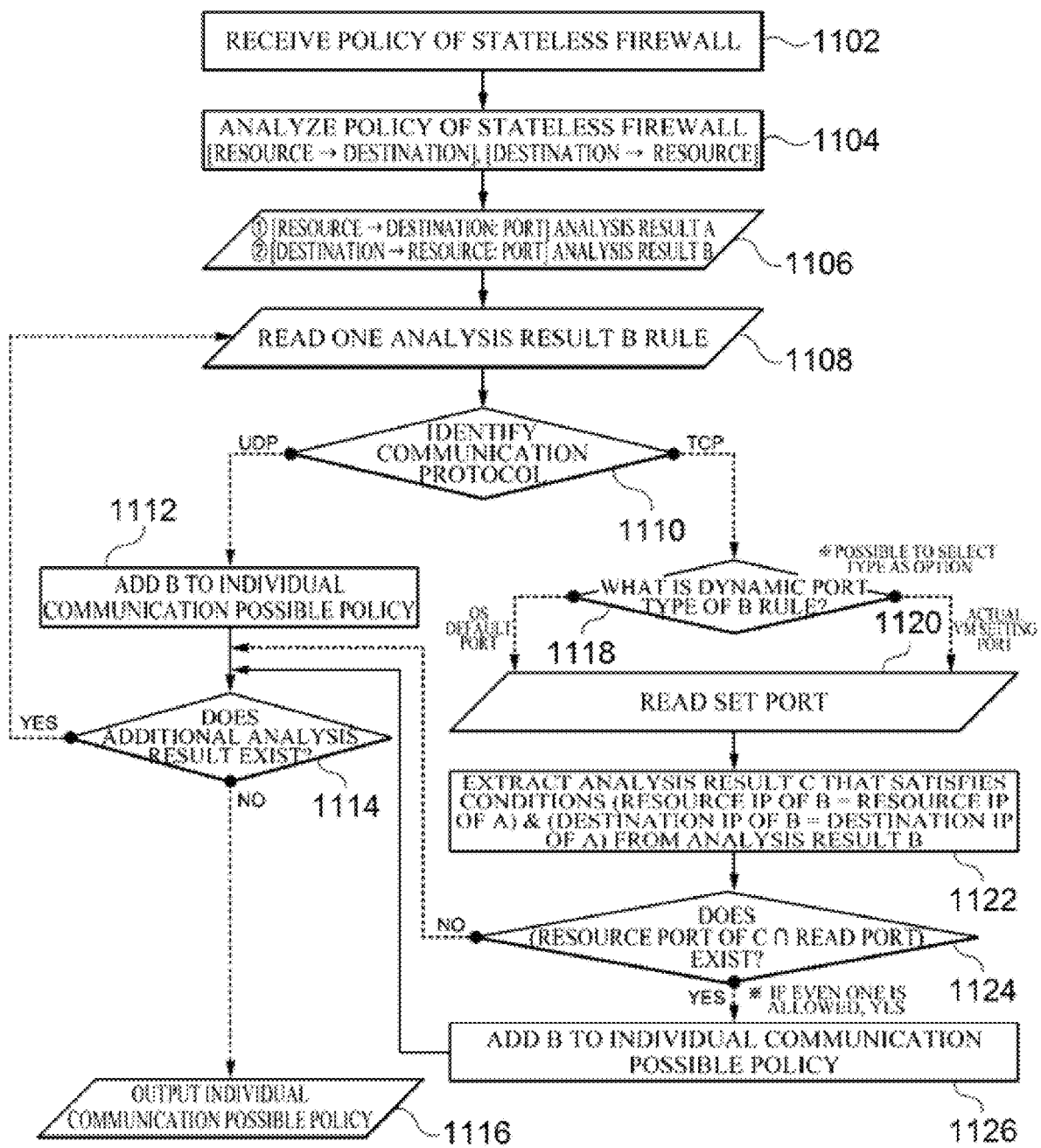
FIG. 11 is a flowchart for illustrating in more detail a process of analyzing an inbound policy of the stateless firewall in step 906 of the firewall analysis process according to an embodiment.

FIG. 11 is a flowchart for illustrating in more detail a process of analyzing an inbound policy of the stateless firewall in step 906 of the firewall analysis process 514 according to an embodiment.

In step 1102, the second analysis sub-module 304 receives a policy of the stateless firewall.

In step 1104, the second analysis sub-module 304 analyzes a [resource→destination] policy and a [resource←destination] policy of the stateless firewall, respectively.

In step 1106, the second analysis sub-module 304 outputs a [resource→destination: port] analysis result A and a [destination→resource: port] analysis result B, respectively.

In step 1108, the second analysis sub-module 304 reads B among the analysis results.

In step 1110, the second analysis sub-module 304 identifies the communication protocol of the analysis result B.

When the communication protocol of B is UDP, in step 1112, the second analysis sub-module 304 stores B in an individual communication possible policy of the corresponding stateless firewall.

In step 1114, the second analysis sub-module 304 determines whether there are more analysis results, and when there is, repeats step 1108 and subsequent steps.

When the analysis result does not exist anymore as the determination result in step 1114, in step 1116, the second analysis sub-module 304 outputs the individual communication possible policy.

On the other hand, when the communication protocol of B is TCP as the determination result in step 1110, in steps 1118 and 1120, the second analysis sub-module 304 reads a port set according to the dynamic port type of B (whether it is an OS default port or a port set in a real virtual machine (VM)).

In step 1122, the second analysis sub-module 304 derives an analysis result C that satisfies the following conditions from the analysis result B.

(Resource IP of B=resource IP of A)&&(destination IP of B=destination IP of A)

In step 1124, the second analysis sub-module 304 determines whether an intersection of the analysis result C and the port read in step 1120 exists.

When the intersection exists as the determination result in step 1124, the second analysis sub-module 304 adds the analysis result B to the communication possible policy and proceeds to step 1114. When no intersection exists as the determination result in step 1124, the second analysis sub-module 304 proceeds directly to step 1114.

Figure 12:
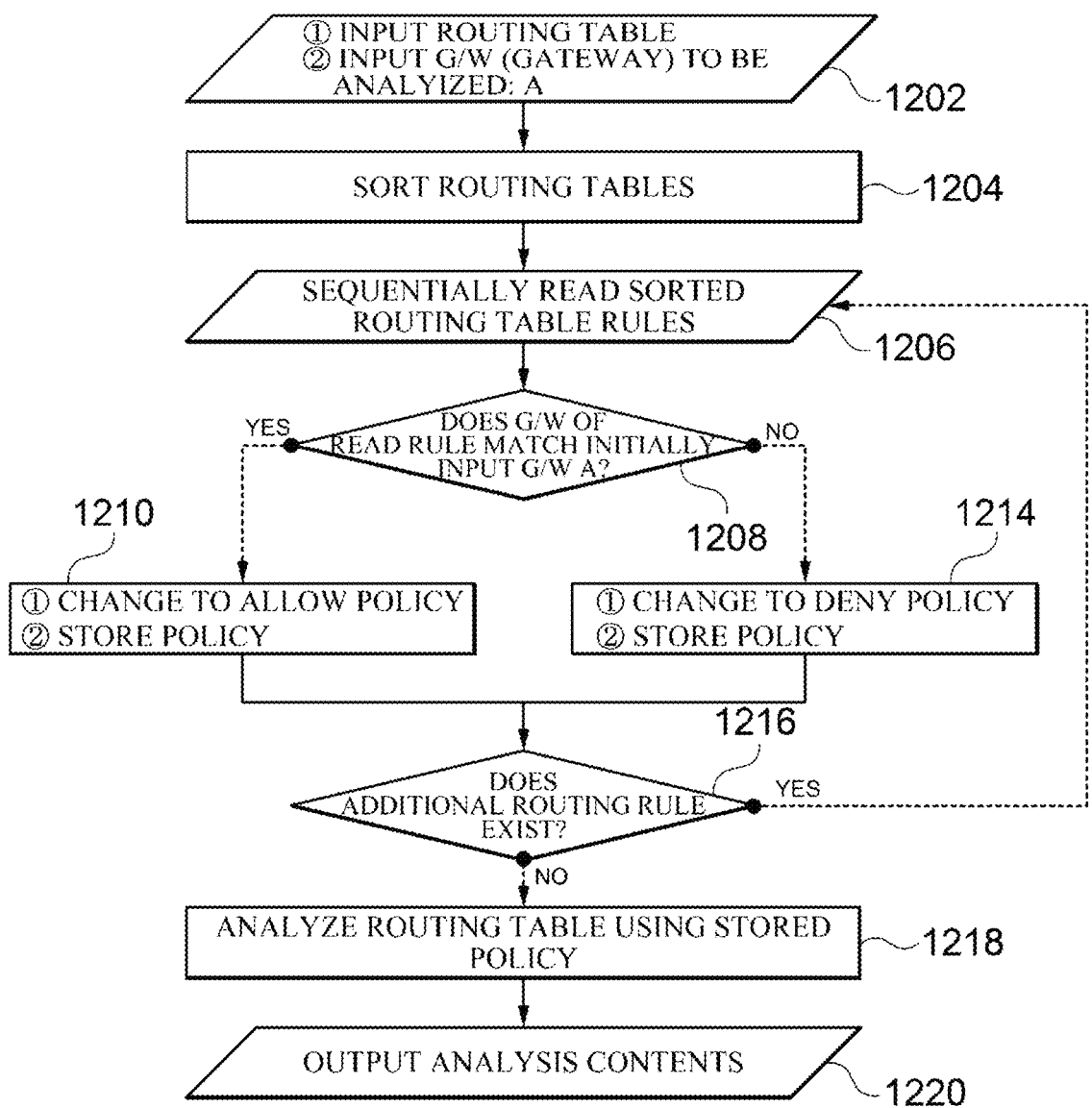
FIG. 12 is a flowchart for illustrating in more detail a process of analyzing a routing table in step 516 of the network analysis method according to an embodiment.

FIG. 12 is a flowchart for illustrating in more detail a process of analyzing a routing table in step 516 of the network analysis method 500 according to an embodiment.

In step 1202, the second analysis sub-module 304 receives a routing table and a gateway A to be analyzed.

In step 1204, the second analysis sub-module 304 sorts an analysis target routing table according to the longest prefix match.

In step 1206, the second analysis sub-module 304 sequentially reads sorted routing rules.

In step 1208, the second analysis sub-module 304 determines whether the gateway read in step 1206 matches the gateway input in step 1202. For example, when the gateway input in step 1202 is an Internet gateway, in the present step, the second analysis sub-module 304 determines whether the Internet gateway is included in the gateway of the routing table.

When the determination result in step 1208 indicates that the gateways match, in step 1210, the second analysis sub-module 304 changes the policy related to the corresponding gateway to an allow policy. Otherwise, when the determination result in step 1208 indicates that the gateways do not match, in step 1214, the second analysis sub-module 304 changes the policy related to the corresponding gateway to a deny policy.

In step 1216, the second analysis sub-module 304 determines whether an additional routing rule exists, and when the determination is affirmative, repeats step 1206 and subsequent steps.

In step 1218, the second analysis sub-module 304 analyzes the routing policy using the stored policy.

In step 1220, the second analysis sub-module 304 outputs the analysis result.

Figure 13:
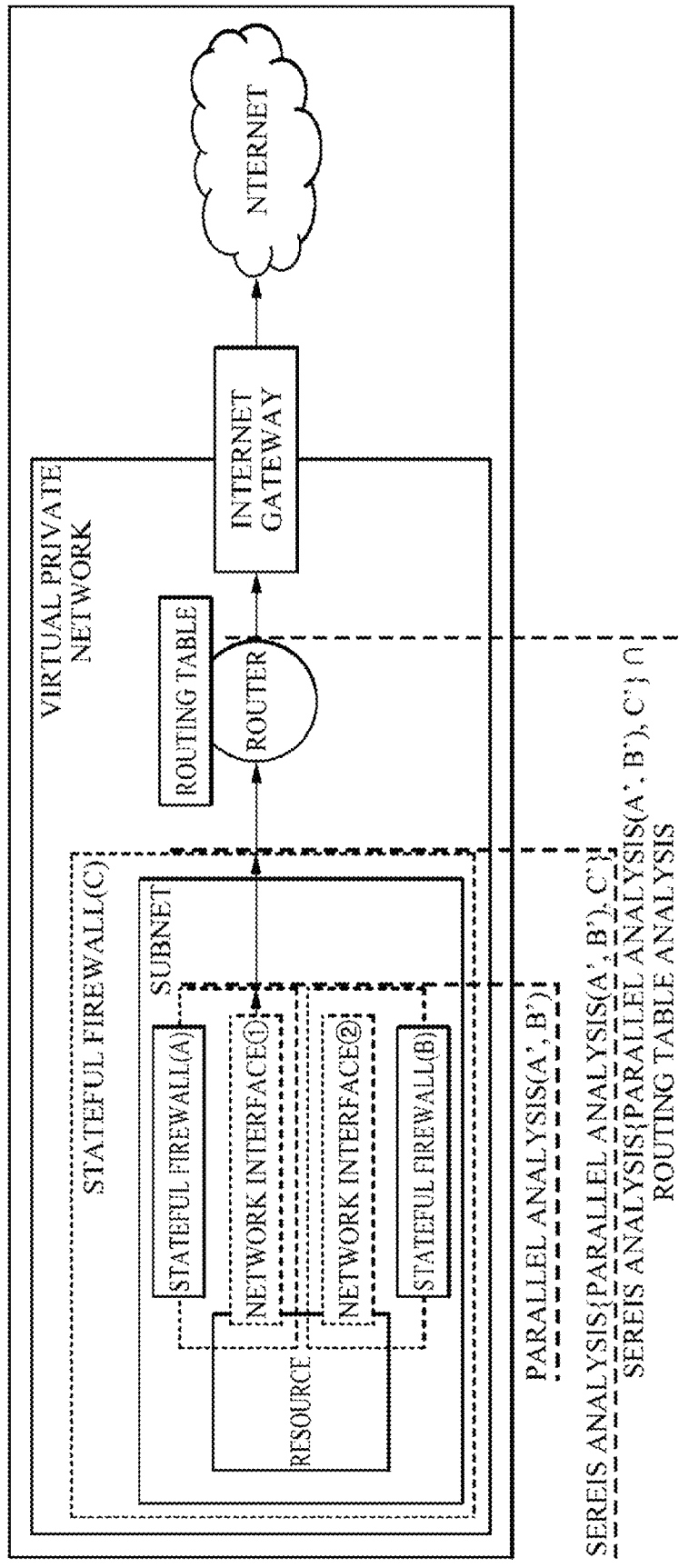
Figure 14:
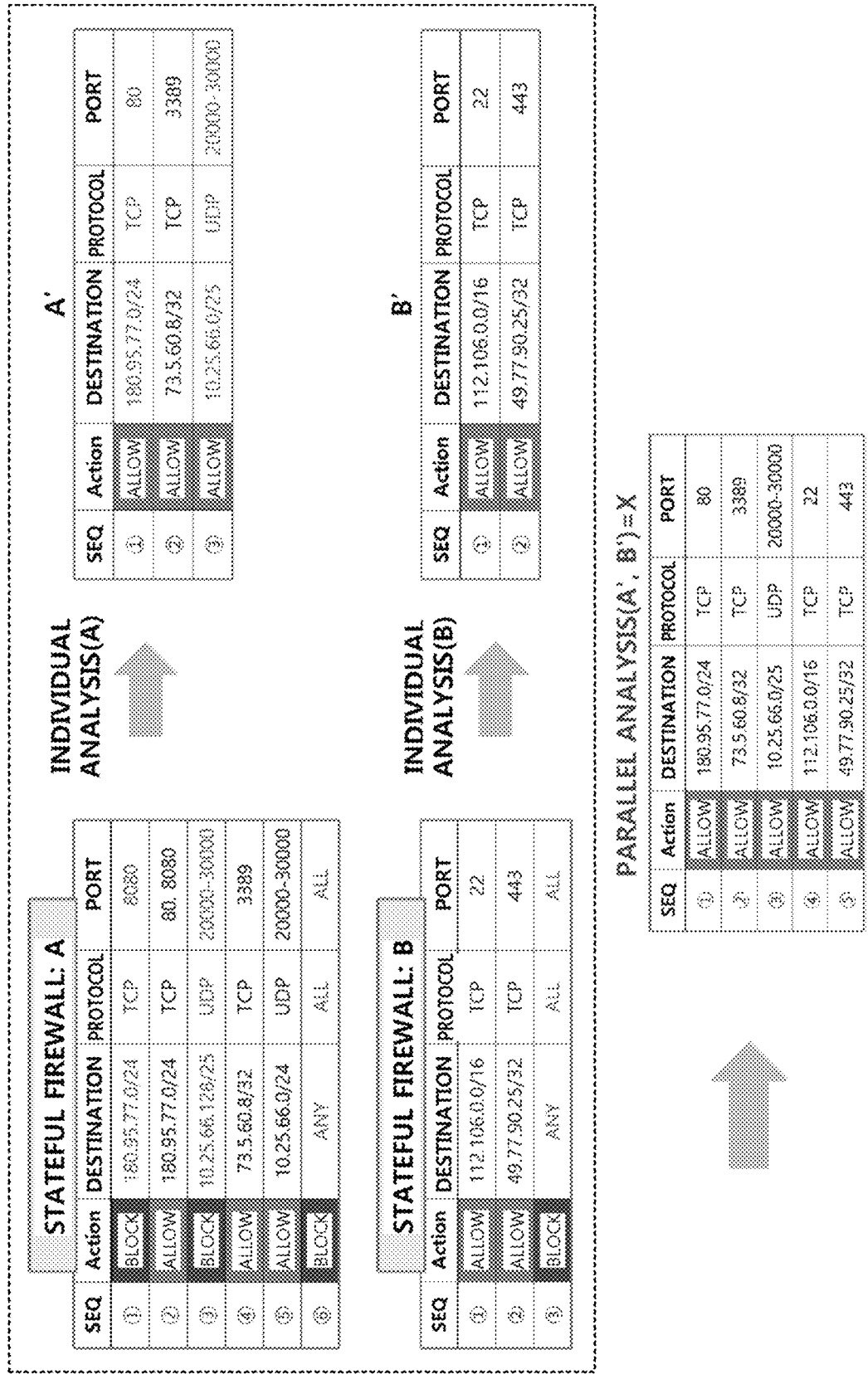
Figure 15:
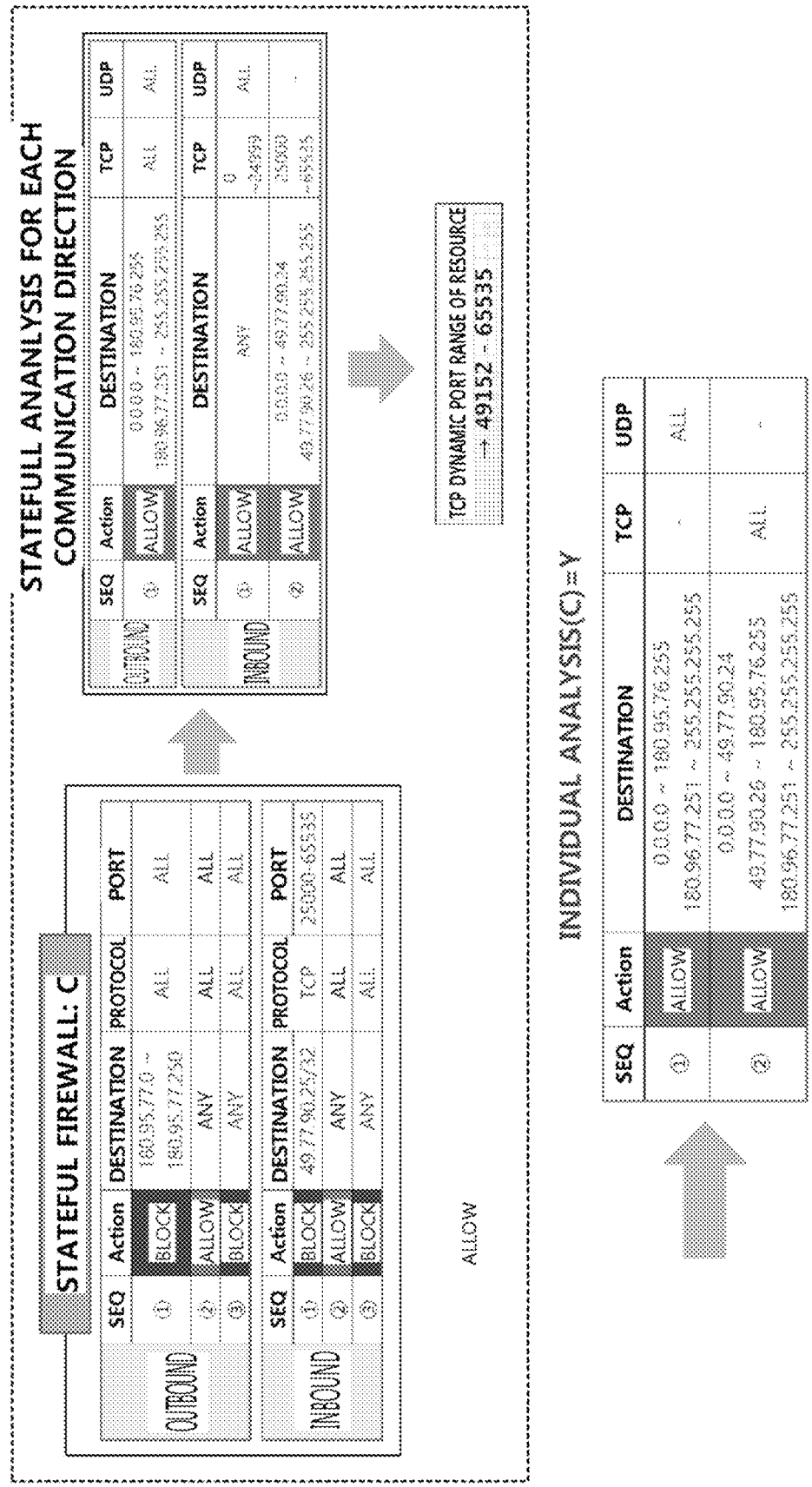
Figure 17:
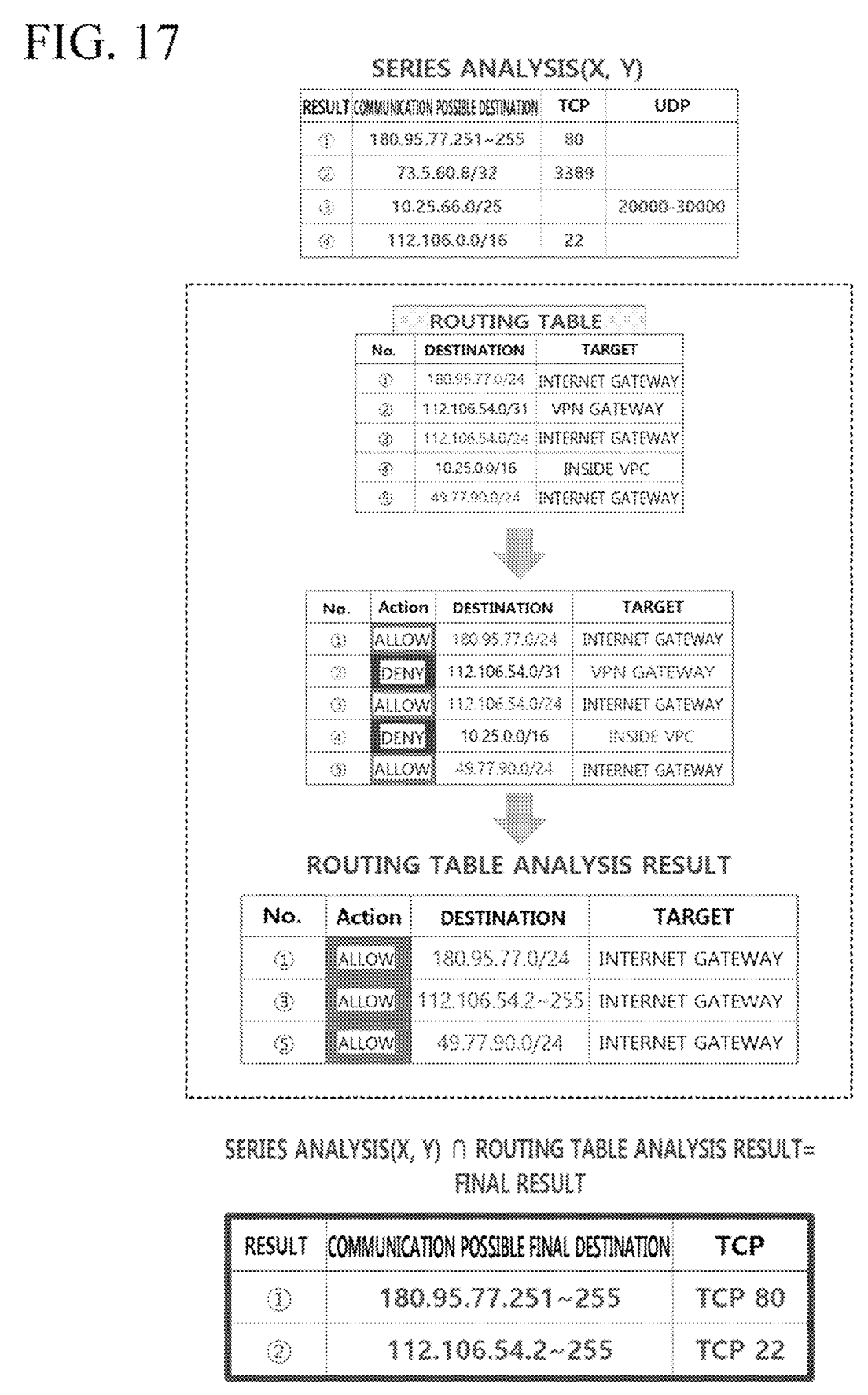

FIGS. 13 to 18 are diagrams for illustrating an example of a process of analyzing a network in a cloud service according to an embodiment. Specifically, FIG. 13 is a diagram for illustrating an example of a structure of an exemplary cloud service, FIG. 14 is a diagram for illustrating an example of performing individual analyses A' and B' and a parallel analysis X of stateful firewalls A and B in the cloud service of FIG. 13, FIG. 15 is a diagram for illustrating an example of performing an individual analysis Y of a stateless firewall C in the cloud service of FIG. 13, FIG. 16 is a diagram for illustrating an example of deriving a communication possible policy of the firewall through the serial analysis of the results of the parallel analysis X and the individual analysis Y, and FIG. 17 is a diagram for illustrating an example of deriving a final communication possible policy by combining the communication possible policy of FIG. 16 and the result of analyzing the routing table. FIG. 18 is a diagram for illustrating an example of a table showing an entire analysis result.

In the case of the cloud service illustrated in FIG. 13, two network interfaces are connected to the resource. Each network interface controls access with different stateful firewalls A and B. As described above, all firewalls (stateful, stateless) connected to the resource perform combined analysis after individual analysis. Firewalls A and B are respectively connected to different interfaces, but are ultimately transmitted from one resource, and thus the individual analysis results A' and B' are analyzed in parallel (union). Then, the packet allowed as a result of parallel analysis is controlled by the stateless firewall C once again before passing through the subnet, and this control may be regarded as a series (intersection) since it is a dual access control concept. Then, by adding up the routing table analysis results, it is possible to finally obtain the communication possible policy of the resource.

Figure 19:
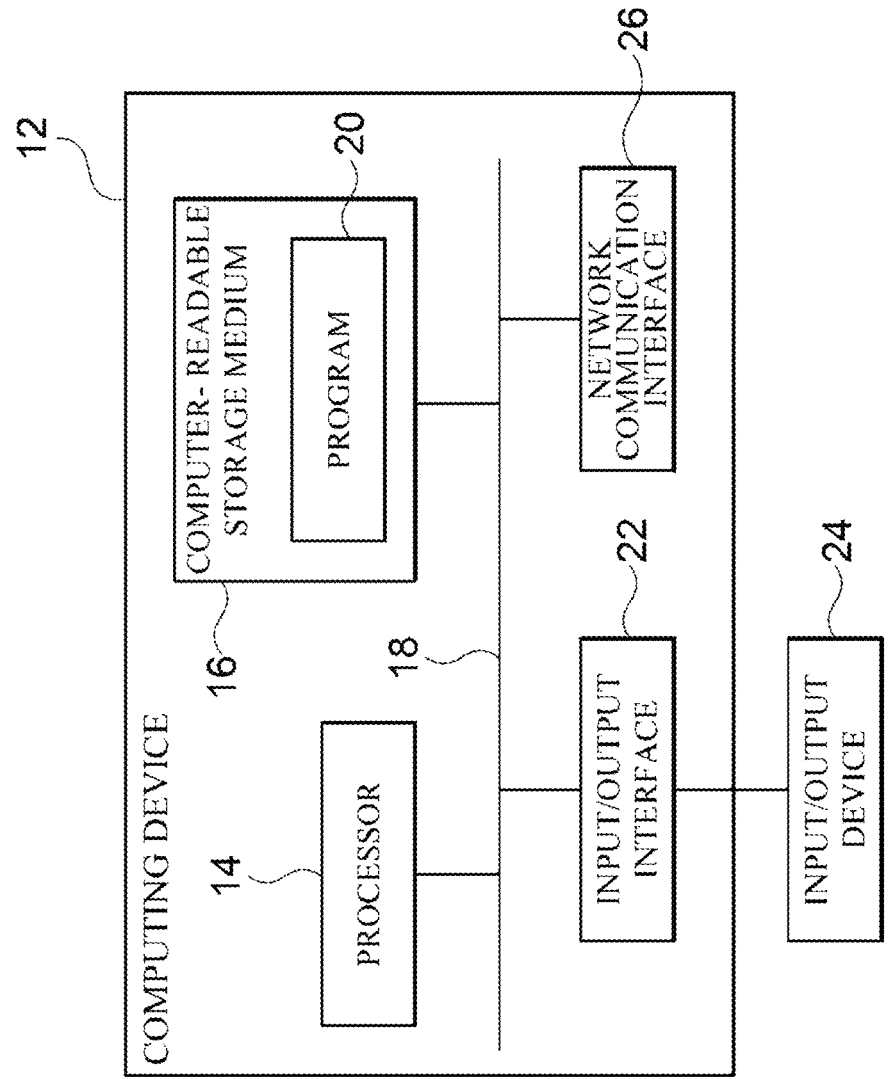
FIG. 19 is a block diagram for exemplarily illustrating a computing environment that includes a computing device suitable for use in embodiments.

FIG. 19 is a block diagram for exemplarily illustrating a computing environment 10 that includes a computing device suitable for use in embodiments. In the illustrated embodiments, each component may have different functions and capabilities in addition to those described below, and additional components may be included in addition to those described below.

The illustrated computing environment 10 includes a computing device 12. In an embodiment, the computing device 12 may be the network analysis apparatus 100 according to embodiments of the present disclosure. The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Meanwhile, the embodiments of the present invention may include a program for performing the methods described herein on a computer, and a computer-readable recording medium including the program. The computer-readable recording medium may include program instructions, a local data file, a local data structure, or the like alone or in combination. The media may be specially designed and configured for the present disclosure, or may be commonly used in the field of computer software. Examples of computer-readable recording media include magnetic media such as hard disks, floppy disks and magnetic tapes, optical recording media such as a CD-ROM and a DVD, and hardware devices specially configured to store and execute program instructions such as a ROM, a RAM, and a flash memory. Examples of the program may include not only machine language codes such as those produced by a compiler, but also high-level language codes that may be executed by a computer using an interpreter or the like.

According to the disclosed embodiments, each of communication possible paths constituting a cloud service and one or more communication allow policies in each communication possible path may be effectively derived, thereby making it possible to easily check the security vulnerabilities of cloud services and improve the security level through the easy check.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. An apparatus for analyzing a network, the apparatus comprising:
   one or more processors; and
   memory storing instructions configured to cause the one or more processors to:
      receive, from a cloud service, information on resources included in the cloud service and information on a network environment of the resources;
      generate a network topology of the cloud service by using the information on the resources and the information on the network environment; and
      determine, from the network topology, communication possible paths of the respective resources and communication allow policies in the respective communication possible paths, wherein each communication possible path indicates a range of destination IPs and a corresponding port for which communication is determined to be possible from a corresponding one of the resources according to an intersection of a firewall analysis of and a routing table analysis, wherein the firewall analysis is based on a firewall in a communication path of the resource and the routing table analysis is based on a routing table of a router in the communication path of the resource.

2. The apparatus of claim 1, wherein the information on the network environment includes a network interface, a stateful firewall policy, a stateless firewall policy, a routing table, or gateway information associated with the resources.

3. The apparatus of claim 1, wherein the instructions are further configured to cause the one or more processors to:
   generate a communication possible path of each of the resources; and
   determine the communication allow policies by performing a firewall policy analysis or a routing table analysis on the communication possible path.

4. The apparatus of claim 3, wherein the instructions are further configured to cause the one or more processors to:
   based on an Internet Protocol (IP) allocated to a resource, among the resources, being a public IP:
      identify a communication path including one or more of a stateful firewall allocated to the resource, a stateless firewall in a subnet to which the resource belongs, and a router in the subnet; and
      add the identified communication path to an external communication possible path of the resource based on an Internet gateway being included in a routing destination of the router.

5. The apparatus of claim 3, wherein the instructions are further configured to cause the one or more processors to:
based on an IP allocated to a resource, among the resources, being a private IP:
identify a communication path including a stateful firewall allocated to the resource, a first stateless firewall in a first subnet to which the resource belongs, or a first router; and
add a second stateless firewall in a second subnet to which a network address translation (NAT) gateway belongs and a second router to the identified communication path based on the NAT gateway being included in a routing destination of the first router.

6. The apparatus of claim 5, wherein the instructions are further configured to cause the one or more processors to add the identified communication path to an external communication possible path of a resource, among the resources, based on an Internet gateway being included in a routing destination of the second router.

7. The apparatus of claim 3, wherein the instructions are further configured to cause the one or more processors to:
identify a communication path including a stateful firewall allocated to a resource, among the resources, a stateless firewall in a subnet to which the resource belongs, and a router in the subnet; and
add the identified communication path to an internal communication possible path of the resource based on a gateway for internal communication being included in a routing destination of the router.

8. The apparatus of claim 3, wherein the instructions are further configured to cause the one or more processors to determine an individual communication allow policy of respective firewalls existing on the communication possible path, and determine a communication allow policy of the firewalls from the individual communication allow policy.

9. The apparatus of claim 8, wherein the instructions are further configured to cause the one or more processors to determine a communication allow policy of the stateless firewall by comparing communication possible band information of the stateless firewall and a dynamic port allow policy of a resource, among the resources, connected to the stateless firewall, based on the firewall being a stateless firewall.

10. The apparatus of claim 8, wherein the instructions are further configured to cause the one or more processors to determine a communication allow policy of the firewalls by applying a parallel analysis between the individual communication allow policies of firewalls located in the same a same network layer and applying a serial analysis between the individual communication allow policies of firewalls located in different network layers, in the communication possible path.

11. The apparatus of claim 8, wherein the instructions are further configured to cause the one or more processors to:
determine a routing allow policy from a routing table of respective routers located on the communication possible path; and
determine an intersection of the communication allow policy of the firewalls and the routing allow policy as the communication allow policy of a resource among the resources.

12. The apparatus of claim 11, wherein the instructions are further configured to cause the one or more processors to determine the routing allow policy by identifying a routing policy corresponding to a destination of the communication possible path among the routing policies of the routing tables.

13. A network analysis method that is performed by a computing device comprising one or more processors and memory storing one or more programs that are executed by the one or more processors to perform the method, the method comprising:
receiving, from a cloud service, information on resources included in the cloud service and information on a network environment of the resources;
determining a network topology of the cloud service by using the information on the resources and the information on the network environment; and
determining, from the network topology, a communication possible path of each of the resources and communication allow policies in the communication possible path, wherein each communication possible path indicates a range of destination IPs and a corresponding port for which communication is determined to be possible from a corresponding one of the resources according to an intersection of a firewall analysis and a routing table analysis, wherein the firewall analysis is based on a firewall in a communication path of the resource and the routing table analysis is based on a routing table of a router in the communication path of the resource.

14. The network analysis method of claim 13, wherein the information on the network environment includes information about a network interface, a stateful firewall policy, a stateless firewall policy, a routing table, or a gateway associated with the one or more resources.

15. The network analysis method of claim 13, wherein the determining of the communication allow policy comprises:
generating a communication possible path of each of the resources; and
determining the communication allow policies by performing, on the communication possible path, a firewall policy analysis or a routing table analysis.

16. The network analysis method of claim 15, wherein the generating a communication possible path of each of the resources further comprises:
based on an IP allocated to a resource, among the resources, being a public IP:
identifying a communication path as including a stateful firewall allocated to the resource, a stateless firewall in a subnet to which the resource belongs, or a router in the subnet; and
adding the identified communication path to an external communication possible path of the resource based on an Internet gateway being included in a routing destination of the router.

17. The network analysis method of claim 15, wherein the generating a communication possible path of each of the resources further comprises:
based on an IP allocated to a resource, among the resources, being a private IP:
identifying a communication path as including a stateful firewall allocated to the resource, a first stateless firewall in a first subnet to which the resource belongs, or a first router; and
adding a second stateless firewall in a second subnet to which a NAT gateway belongs and a second router to the identified communication path based on the NAT gateway being included in a routing destination of the first router.

18. The network analysis method of claim 17, wherein the generating a communication possible path of each of the resources includes adding the identified communication path to an external communication possible path of the resource based on an Internet gateway being included in a routing destination of the second router.

19. The network analysis method of claim 15, wherein generating a communication possible path of each of the resources includes:
   identifying a communication path as including a stateful firewall allocated to the resource, a stateless firewall in a subnet to which the resource belongs, and a router in the subnet; and
   adding the identified communication path to an internal communication possible path of the resource based on a gateway for internal communication being included in a routing destination of the router.

20. The network analysis method of claim 15, wherein the determining the communication allow policies includes determining an individual communication allow policy of respective firewalls existing on the communication possible path, and deriving a communication allow policy of the firewalls from the individual communication allow policy.

21. The network analysis method of claim 20, wherein the determining the communication allow policies includes deriving a communication allow policy of the stateless firewall by comparing communication possible band information of the stateless firewall and a dynamic port allow policy of a resource connected to the stateless firewall, based on the firewall being a stateless firewall.

22. The network analysis method of claim 20, wherein the determining the communication allow policies includes determining a communication allow policy of the firewalls by applying a parallel analysis between the individual communication allow policies of firewalls located in a same network layer and applying a serial analysis between the individual communication allow policies of firewalls located in different network layers, in the communication possible path.

23. The network analysis method of claim 20, wherein the determining the communication allow policies comprises:
   determining a routing allow policy from routing tables of respective routers located on the communication possible path; and
   determining an intersection of the communication allow policy of the firewalls and the routing allow policy as the communication allow policy of a resource among the resources.

24. The network analysis method of claim 23, wherein the determining the communication allow policies further comprises determining the routing allow policy by identifying, among the routing policies of the routing tables, a routing policy corresponding to a destination of the communication possible path.

* * * * *